US008530617B2

(12) United States Patent
Harimoto

(10) Patent No.: US 8,530,617 B2
(45) Date of Patent: Sep. 10, 2013

(54) SILICON-CONTAINING PARTICLE, PROCESS FOR PRODUCING THE SAME, ORGANIC-POLYMER COMPOSITION, CERAMIC, AND PROCESS FOR PRODUCING THE SAME

(75) Inventor: Yukinari Harimoto, Hadano (JP)

(73) Assignee: Dow Corning Toray Company, Ltd., Chiyoda-ku, Tokyo (JP)

( * ) Notice: Subject to any disclaimer, the term of this patent is extended or adjusted under 35 U.S.C. 154(b) by 244 days.

(21) Appl. No.: 12/865,177

(22) PCT Filed: Jan. 23, 2009

(86) PCT No.: PCT/JP2009/051525
§ 371 (c)(1),
(2), (4) Date: Oct. 11, 2010

(87) PCT Pub. No.: WO2009/096501
PCT Pub. Date: Aug. 6, 2009

(65) Prior Publication Data
US 2011/0033708 A1    Feb. 10, 2011

(30) Foreign Application Priority Data

Jan. 30, 2008    (JP) ................ 2008-019863

(51) Int. Cl.
*C08F 6/00* (2006.01)
(52) U.S. Cl.
USPC ........... 528/481; 524/858; 524/860; 524/861; 524/862; 524/863
(58) Field of Classification Search
None
See application file for complete search history.

(56) References Cited

U.S. PATENT DOCUMENTS

| | | | |
|---|---|---|---|
| 3,293,194 A | 12/1966 | Lovie et al. | |
| 4,312,970 A | 1/1982 | Gaul, Jr. | |
| 4,340,619 A | 7/1982 | Gaul, Jr. | |
| 4,395,460 A | 7/1983 | Gaul | |
| 4,397,828 A | 8/1983 | Seyferth et al. | |
| 4,404,153 A | 9/1983 | Gaul, Jr. | |
| 4,482,689 A | 11/1984 | Haluska | |
| 4,540,803 A | 9/1985 | Cannady | |
| 4,543,344 A | 9/1985 | Cannady | |
| 4,743,670 A * | 5/1988 | Yoshida et al. | 528/15 |
| 4,774,312 A | 9/1988 | Burns | |
| 4,835,238 A | 5/1989 | Burns | |
| 4,916,200 A | 4/1990 | Burns | |
| 4,929,742 A | 5/1990 | Burns | |
| 5,153,160 A | 10/1992 | Saruyama et al. | |
| 5,824,280 A * | 10/1998 | Dahn et al. | 423/325 |
| 6,174,982 B1 | 1/2001 | Nishida et al. | |
| 6,281,286 B1 * | 8/2001 | Chorvath et al. | 524/862 |
| 6,649,704 B2 * | 11/2003 | Brewer et al. | 525/431 |
| 6,759,487 B2 * | 7/2004 | Gornowicz et al. | 525/478 |
| 7,658,863 B2 * | 2/2010 | Aramata et al. | 252/182.1 |

| | | | |
|---|---|---|---|
| 2003/0104131 A1 | 6/2003 | Konno et al. | |
| 2010/0209707 A1 | 8/2010 | Morita et al. | |
| 2012/0121981 A1 * | 5/2012 | Harimoto et al. | 429/213 |

FOREIGN PATENT DOCUMENTS

| | | |
|---|---|---|
| EP | 0867958 A1 | 9/1998 |
| JP | 63-312325 A | 12/1988 |
| JP | 64-051467 A | 2/1989 |
| JP | 01-145317 A | 6/1989 |
| JP | 04-29748 A | 1/1992 |
| JP | 04-334551 A | 11/1992 |
| JP | 10-212358 A | 8/1998 |
| JP | 10-275617 A | 10/1998 |
| JP | 2003-171180 A | 6/2003 |
| JP | 2003-226812 A | 8/2003 |
| JP | 2006-193700 A | 7/2006 |
| JP | 2008-285552 A | 11/2008 |
| WO | WO 9829476 A1 | 7/1998 |

OTHER PUBLICATIONS

English language abstract for JP 63-312325 extracted from espacenet.com database Nov. 23, 2010, 10 pages.
English language abstract for JP 64-051467 extracted from PAJ database Nov. 29, 2010, 9 pages.
English language abstract for JP 01-145317 extracted from espacenet.com database Nov. 23, 2010, 9 pages.
English language abstract for JP 04-29748 extracted from espacenet.com database Nov. 23, 2010, 8 pages.
English language abstract for JP 04-334551 extracted from espacenet.com database Nov. 23, 2010, 18 pages.
English language translation and abstract for JP 10-212358 extracted from PAJ database Nov. 29, 2010, 35 pages.
English language abstract for JP 10-275617 extracted from espacenet.com database Nov. 23, 2010, 9 pages.
English language abstract for JP 2003-171180 extracted from espacenet.com database Nov. 23, 2010, 7 pages.
English language translation and abstract for JP 2003-226812 extracted from PAJ database Nov. 29, 2010, 66 pages.
English language translation and abstract for JP 2006-193700 extracted from PAJ database Nov. 29, 2010, 37 pages.
English language abstract for JP 2008-285552 extracted from espacenet.com database Nov. 23, 2010, 13 pages.
English language abstract for WO 9829476 extracted from espacenet.com database Nov. 23, 2010, 30 pages.
PCT International Search Report for PCT/JP2009/051525 dated Apr. 21, 2009, 4 pages.
Article: Noll et al., "Chemistry and Technology of Silicones—Chapter 5", Academic Press, Inc. 1968, 58 pages.

(Continued)

*Primary Examiner* — Marc Zimmer
(74) *Attorney, Agent, or Firm* — Howard & Howard Attorneys PLLC

(57) ABSTRACT

A process for producing silicon-containing particles having an extremely small particle diameter by a simple process without using surface-active agents or the like. The process is characterized by forming silicon-containing particles as a result of phase separation from an organic polymer, wherein the phase separation is achieved by an addition reaction, condensation reaction, ring-opening reaction, or a radical reaction of a curable silicon-containing compound or a curable composition that contains said compound, and the silicon-containing compound or the composition is maintained in a uniform liquid, fused, or dissolved phase with the organic polymer that is free of silicon and does not participate in the curing reaction of the silicon-containing compound or the composition.

23 Claims, 5 Drawing Sheets

(56) References Cited

OTHER PUBLICATIONS

Article: Nametkin et al., "1,3-Disilacyclobutanes and Their Polymers", A.V. Topchiev Institute of Petrochemical Synthesis, vol. 170, No. 5, 1966, pp. 972-975.

Article: Kriner, "Catalytic Polymerization of 1,3-Disilacyclobutane Derivatives", Journal of Polymer Science, Part A-1, vol. #4, 1966, pp. 444-446.

Article: Cundy et al., "The Role of the Transition Metal in the Homogeneous Catalytic . . . ", Journal of Organometallic Chemistry, No. 44, 1972, pp. 291-297.

Article: Nametkin et al., "Polymerization of Silacyclobutane Monomers Catalyzed by Haildes of Variable Valence Metals", A.V. Topchiev Institute of Petrochemical Synthesis, vol. 208, No. 5, 1973, pp. 128-131.

Article: Burns et al., "Alkyl- and arylsilsesquiazanes: effect of the R group on polymer degradation . . . ", Journal of Materials Sciences, No. 22, 1987, pp. 2609-2614.

Article: Delgado et al., "Contrasting One- and Two-Cation Binding Behavior in syn- and anti-Anthrquinone Bibracchial Podand (BiP) . . . ", Journal American Chemical Society, No. 110, 1988, pp. 119-124.

Article: Dunogues et al., "New Polycarbosilane Models 1. Poly[(methylchlorosilylene) methylene] . . . ", Macromolecules, 1988, No. 21, pp. 30-34.

Article: Furukawa et al., "Optical Properties of Silicon Network Polymers", Marcromolecules, 1990, No. 23, pp. 3423-3426.

Article: Sakamoto et al., "Highly Ordered High Molecular Weight Alternating Polysilylene Copolymer . . . ", Macromolecules, 1990, No. 23, pp. 4494-4496.

Article: Shono et al., "Electroreductive Formation of Polysilanes", J. Chem. Soc., Chem. Commun., 1990, pp. 1160-1161.

Article: Manning et al. "The Systematic Synthesis of Complexes containing . . . ", J. Chem. Soc., Chem. Commun., 1992, pp. 897-898.

\* cited by examiner (a)　　　　　　(b)

SILICON-CONTAINING PARTICLE, PROCESS FOR PRODUCING THE SAME, ORGANIC-POLYMER COMPOSITION, CERAMIC, AND PROCESS FOR PRODUCING THE SAME

RELATED APPLICATIONS

This application claims priority to and all the advantages of International Patent Application No. PCT/JP2009/051525, filed on Jan. 23, 2009, which claims priority to Japanese Patent Application No. JP 2008-019863, filed on Jan. 30, 2008.

TECHNICAL FIELD

The present invention relates to a process for producing silicon-containing particles, to silicon-containing particles obtained by the process, to an organic polymer composition comprising the particles, to a process for producing a ceramic material by using the particles, and to a ceramic material obtained by the process.

BACKGROUND ART

Silicon-containing particles, typically represented by silicone rubber particles, find use in cosmetic raw materials, as additives to organic resins, etc. A known process for producing such silicon-containing particles consists of curing a curable silicone composition in an emulsification state in an aqueous solution of a surface-active agent (see Japanese Unexamined Patent Application Publication (hereinafter referred to as "Kokai") S64-51467).

However, since the silicon-containing particles obtained by the aforementioned process contain a large amount of surface-active agents required for the process, they lose some properties inherent in the original silicon-containing particles, such as resistance to heat, electrical characteristics, etc. Furthermore, in the above process, control of particle diameter of the obtained particles largely depends on such factors as type and concentration of the surface-active agent, or emulsifying ability of an emulsifying apparatus, and control of particle diameter of the obtained particles is more difficult when small particles are desired.

On the other hand, known in the art is a process for producing a ceramic material that contains Si, O, and C, the process comprises pyrolysis of a composition that comprises a silicon-containing ceramic precursor polymer (see Kokai H10-275617). Another known process comprises; impregnating graphite with one or more kinds of organic silicon compounds selected from cross-linkable silanes and siloxanes; forming a cross-linked product of the above-mentioned organic silicon compound in the graphite; heating and reacting the graphite in a nonoxidative gas at 300 to 1,200° C., and thus obtaining a C/Si/O composite material (see Kokai 2003-171180).

However, the above-mentioned process for producing a ceramic material involves a process for crushing the ceramic material to form super-fine particles, but the fine particles obtained by crushing have an irregular shape, and therefore it is impossible to obtain a super-fine spherical ceramic material of good flowability and filling ability with the aforementioned known process.

It is an object of the present invention to provide a process for producing silicon-containing particles of an extremely small diameter by a simple process and without using surface-active agents or the like; to provide silicon-containing particles with an easily controllable diameter, with excellent dispersibility in an organic polymer, and with high rate of ceramification by baking; and to provide an organic polymer composition that is characterized by excellent flame-resistant properties, heat resistant properties, and mechanical characteristics, such as ultimate elongation, flexibility, formability, resistance to impacts, abrasive resistance, inner stress relaxation, crack resistant properties, etc.

It is another object of the present invention to provide a process for producing a ceramic material with controllable properties and with extremely small particle diameter in a simple process, as well as to provide a ceramic material that possesses the aforementioned characteristics.

DISCLOSURE OF INVENTION

The process of the present invention for producing silicon-containing particles is characterized by forming silicon-containing particles as a result of phase separation from an organic polymer, wherein the phase separation is achieved by a curing reaction of a curable silicon-containing compound or a curable composition that contains the compound, and the compound or the composition is maintained in a uniform liquid, fused, or dissolved phase with the organic polymer that is free of silicon and does not participate in the curing reaction of the compound or the composition.

The silicon-containing particles of the present invention are characterized by being obtained by the aforementioned process.

The organic polymer composition of the present invention is characterized by comprising the aforementioned silicon-containing particles and a silicon-free organic polymer.

The process of the present invention for producing a ceramic material is characterized by baking silicon-containing particles formed by phase separation from an organic polymer, wherein the phase separation is achieved by a reaction of curing of a curable silicon-containing compound or a curable composition that contains the compound, and the compound or the composition is maintained in a uniform liquid, fused, or dissolved phase with the organic polymer that is free of silicon and does not participate in the curing reaction of the compound or the composition.

The ceramic material of the present invention is characterized by being obtained by the aforementioned process.

Effects of Invention

The process of the present invention for producing silicon-containing particles is characterized by producing silicon-containing particles having an extremely small particle diameter by a simple process and without using of surface-active agents or the like.

The silicon-containing particles of the present invention are characterized by excellent dispersibility in an organic polymer and by a high degree of ceramification by baking.

The organic polymer composition of the invention is characterized by excellent mechanical characteristics such as ultimate elongation, flexibility, formability, resistance to impacts, abrasive resistance, inner stress relaxation, crack resistant properties, etc.

The process of the present invention for producing a ceramic material makes it possible to produce in a simple process a ceramic material with controllable properties and with an extremely small particle diameter.

The ceramic material of the present invention is characterized by extremely small particle diameter.

DETAILED DESCRIPTION OF THE INVENTION

Figure 1:
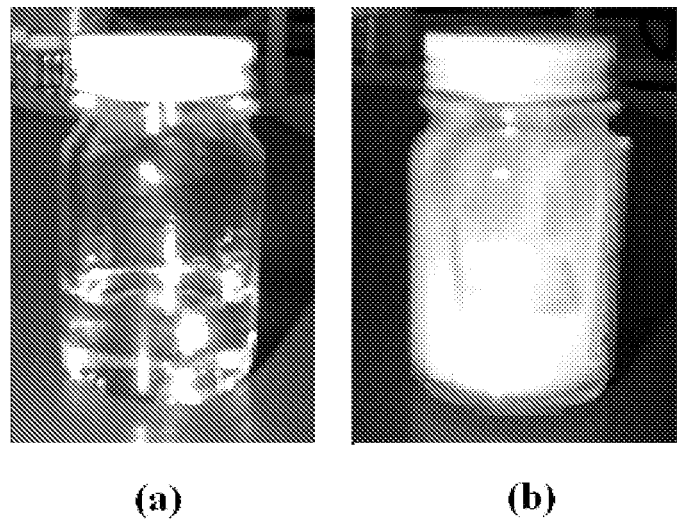
FIG. 1 is a photograph that illustrates the state (a) prior to the reaction and the state (b) after the reaction conducted in Practical Example 1.
Figure 2:
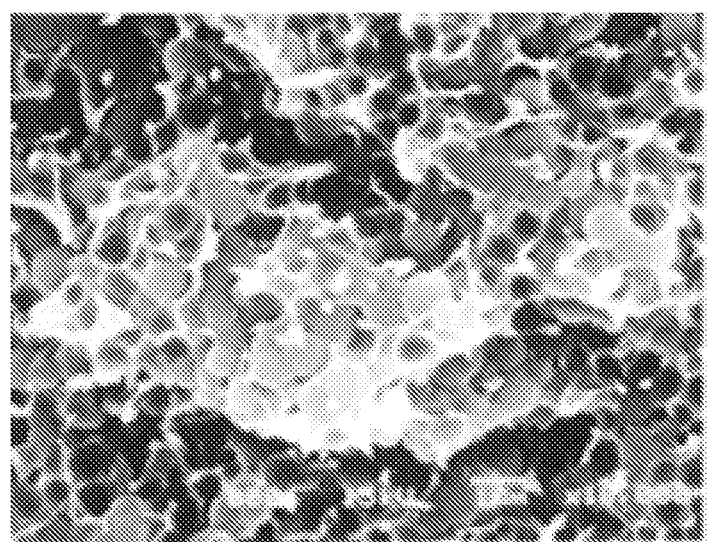
FIG. 2 is an electron microscope photograph of a polystyrene resin with silicon-containing particles prepared in Practical Example 1.
Figure 3:
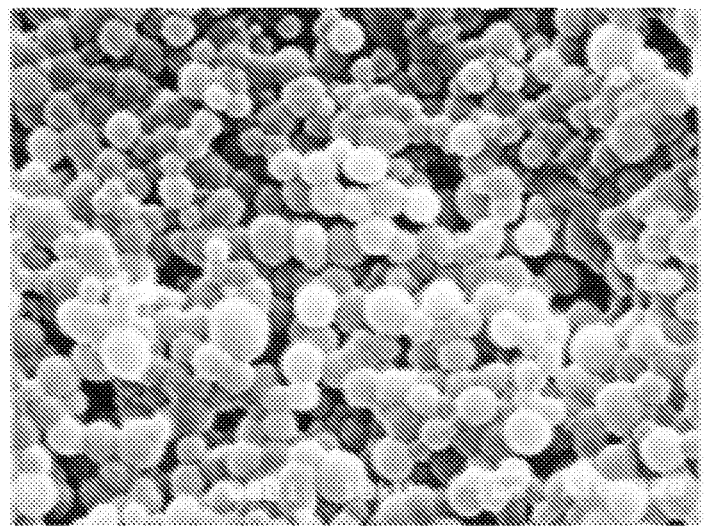
FIG. 3 is an electron microscope photograph of silicon-containing particles prepared in Practical Example 1.
Figure 4:
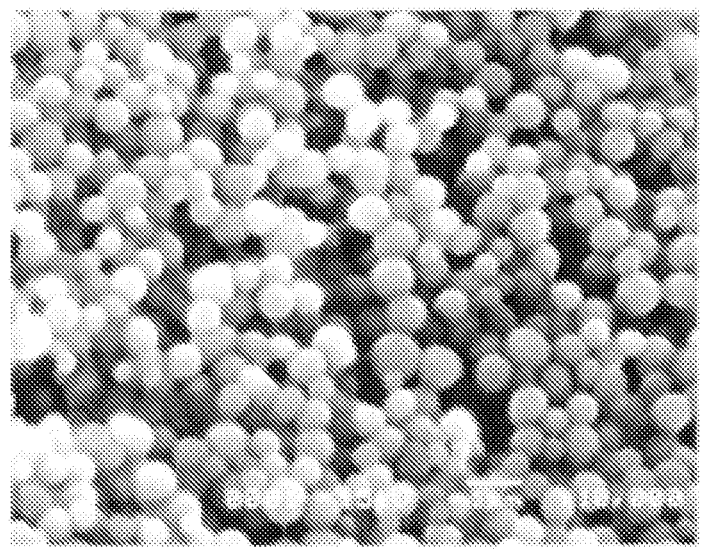
FIG. 4 is an electron microscope photograph of a SiOC-based ceramic material prepared in Practical Example 1 by baking only silicon-containing particles.
Figure 5:
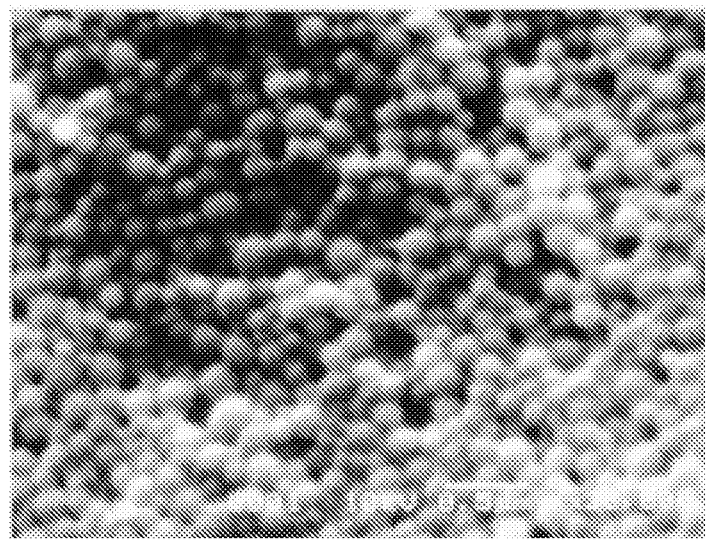
FIG. 5 is an electron microscope photograph of a ceramic material prepared in Practical Example 2.
Figure 6:
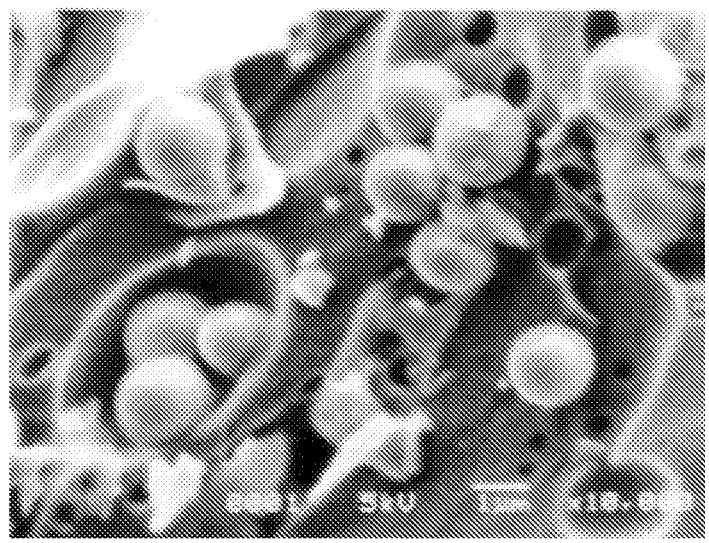
FIG. 6 is an electron microscope photograph of a ceramic material prepared in Practical Example 4.
Figure 7:
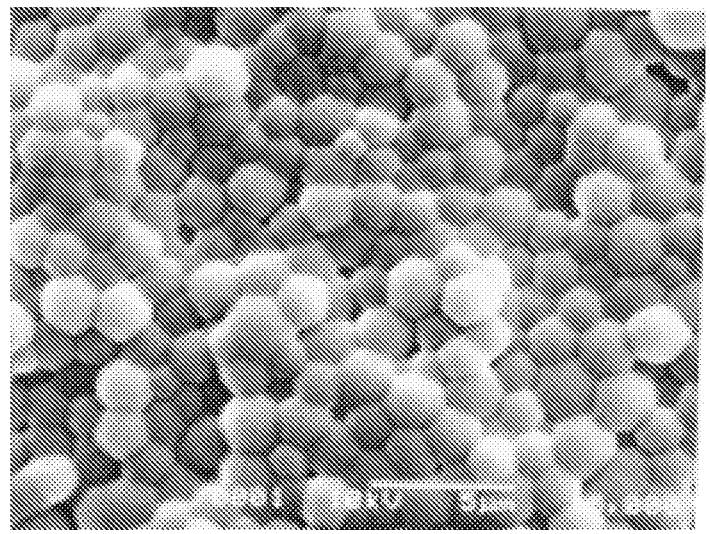
FIG. 7 is an electron microscope photograph of silicon-containing particles prepared in Practical Example 13.
Figure 8:
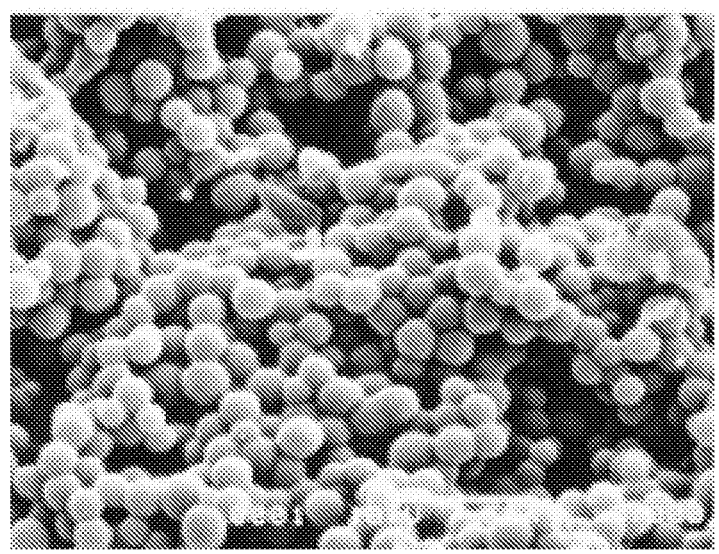
FIG. 8 is an electron microscope photograph of a ceramic material prepared in Practical Example 13.
Figure 9:
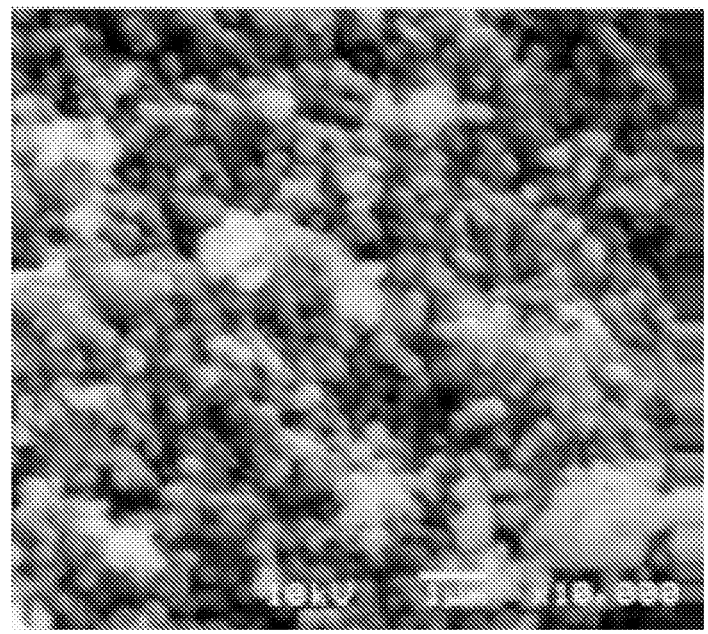
FIG. 9 is an electron microscope photograph of a ceramic material prepared in Practical Example 14.

The process of the present invention for producing silicon-containing particles is characterized by forming silicon-containing particles as a result of phase separation from an organic polymer, wherein the phase separation is achieved by a curing reaction of a curable silicon-containing compound or a curable composition that contains said compound, and the silicon-containing compound or the composition is maintained in a uniform liquid, fused, or dissolved phase with the organic polymer that is free of silicon and does not participate in the curing reaction of the silicon-containing compound or the composition.

The organic polymer is a component that is used for forming the silicon-containing particles by compatibilizing a curable silicon-containing compound or a curable composition that contains said compound at the initial stage of the reaction, and then by separating phase of products obtained by curing the silicon-containing compound or the composition.

There are no special restrictions with regard to the aforementioned organic polymer, provided that it does not participate in the curing reaction of the silicon-containing compound or the composition which contains said compound, possesses compatibility with the silicon-containing compound or the composition at the initial stage of the curing reaction, and that the compatibility is reduced with respect to the product obtained by the curing reaction of the silicon-containing compound or the composition. More specifically, when heat is required for curing the silicon-containing compound or the composition that contains the compound, it is desirable that this polymer be able to form a uniform phase at the initial temperature of the curing reaction of the silicon-containing compound or the composition that contains said compound, and it is not necessary to form a uniform phase in the state when the reaction temperature is not yet reached.

The aforementioned organic polymer can be exemplified by the following compounds: paraffin that is in a liquid or a wax-like state at room temperature; polyethylene, polypropylene, polystyrene, polymethyl methacrylate, urethane resin, AS resin, ABS resin, polyvinyl chloride, polyacetal, polycarbonate, polyester, or a similar thermoplastic resin; coal tar, high molecular aromatic compound, phenolic resin, epoxy resin, urea resin, melamine resin, fluoro resin, imide resin, urethane resin, furan resin, or a similar thermosetting resin; or a mixture thereof.

The silicon-containing compound may be represented by siloxanes, silanes, silazanes, carbosilanes, or mixtures thereof. Specific examples are the following: polymers, oligomers, monomers, or similar siloxanes with Si—O—Si bonds; polymers oligomers, monomers, or similar silanes with Si—Si bonds; polymers, oligomers, monomers, or similar silalkylenes with Si—$(CH_2)_n$—Si bonds; polymers, oligomers, monomers, or similar silarylenes with Si—$(C_6H_4)_n$—Si; polymers, oligomers, monomers, or similar silazanes with Si—N—Si bonds; silicon-containing compounds having of at least two types of the following bonds: Si—O—Si, Si—Si, Si—$(CH_2)_n$—Si, Si—$(C_6H_4)_n$—Si, Si—N—Si; and mixtures thereof. In the above formulae, "n" is an integer equal to or greater than 1.

The siloxanes may be represented by the following average unit formula:

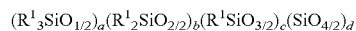

$(R^1{}_3SiO_{1/2})_a(R^1{}_2SiO_{2/2})_b(R^1SiO_{3/2})_c(SiO_{4/2})_d$ wherein $R^1$ may be the same or different and may be selected from substituted or unsubstituted monovalent hydrocarbon groups, hydrogen atoms, halogen atoms, epoxy-containing organic groups, acryl- or methacryl-containing organic groups, amino-containing organic groups, mercapto-containing organic groups, alkoxy groups, and hydroxy groups; "a", "b", "c", and "d" are numbers that are equal to or greater than 0 and are equal to or lower than 1, and that satisfy the following condition: "a+b+c+d=1"; however, "a", "b" and "c" cannot be equal to 0 altogether at the same time.

The monovalent hydrocarbon groups represented by $R^1$ may be exemplified by alkyl groups, alkenyl groups, aralkyl groups, or aryl groups. The alkyl groups may comprise alkyl groups having 1 to 12 carbon atoms, preferably 1 to 6 carbon atoms. Alkyl groups may be represented by any of the following: linear-chained or branch-chained alkyl groups, cycloalkyl groups, or cycloalkylene groups (alkyl groups that combine linear-chained or branch-chained alkylene groups (preferably methylene groups, ethylene groups, or similar alkylene groups having 1 to 6 carbon atoms) with carbon rings (preferably rings having 3 to 8 carbon atoms)). The linear-chained or branch-chained alkyl groups may have 1 to 6 carbon atoms and may be exemplified by methyl groups, ethyl groups, n-propyl groups, isopropyl groups, butyl groups, t-butyl groups, pentyl groups, and hexyl groups. The cycloalkyl groups may have 4 to 6 carbon atoms and may be exemplified by cyclobutyl groups, cyclopentyl groups, and cyclohexyl groups. The alkenyl groups may have 2 to 12 carbon atoms, preferably, 2 to 6 carbon atoms. The alkenyl group with 2 to 6 carbon atoms may be exemplified by vinyl groups, propenyl groups, butenyl groups, pentenyl groups, and hexenyl group, of which the vinyl groups are preferable. The aralkyl groups may have 7 to 12 carbon atoms. The aralkyl groups with 7 to 12 carbon atoms may be exemplified by benzyl groups, phenethyl groups, and phenylpropyl. The aryl groups may have 6 to 12 carbon atoms and may be exemplified by phenyl groups, naphthyl groups, and tolyl groups. The aforementioned monovalent hydrocarbon groups may have substituents. Such substituents are represented by fluorine atoms, chlorine atoms, bromine atoms, iodine atoms, or other halogens; hydroxyl groups; methoxy groups, ethoxy groups, n-propoxy groups, isopropoxy groups, or similar alkoxy groups. Such substituted hydrocarbon groups may be exemplified by 3-chloropropyl groups, 3,3,3-trifluoropropyl groups, perfluorobutylethyl groups, and perfluorooctylethyl groups.

The halogen atoms represented by $R^1$ may comprise fluorine atoms, chlorine atoms, bromine atoms, and iodine atoms, of which chlorine atoms are preferable.

The epoxy-containing organic groups represented by $R^1$ may be exemplified by 3-glycidoxypropyl groups, 4-glycidoxypropyl groups, or similar glycidoxyalkyl groups; 2-(2, 3-epoxycyclohexyl)-ethyl groups, 3-(2,3-epoxycyclohexyl)-propyl groups, or similar epoxycyclohexylalkyl groups; 4-oxiranylbutyl groups, 8-oxiranyloctyl group, or similar oxiranylalkyl groups. Preferable are glycidoxyalkyl, in particular, 3-glycidoxypropyl groups.

The acryl- or methacryl-containing organic groups represented by $R^1$ may be exemplified, e.g., by 3-acryloxypropyl groups, 3-methacryloxypropyl groups, 4-acryloxybutyl groups, and 4-methacryloxybutyl groups, of which 3-methacryloxypropyl groups are preferable.

The amino-containing organic groups represented by $R^1$ may be exemplified, e.g., by 3-aminopropyl groups, 4-aminopropyl groups, N-(2-aminoethyl)-3-aminopropyl groups, of which 3-aminopropyl groups and N-(2-aminoethyl)-3-aminopropyl groups are preferable.

The mercapto-containing organic groups represented by $R^1$ may be exemplified, e.g., by 3-mercaptopropyl groups and 4-mercaptobutyl groups.

The alkoxy groups represented by $R^1$ may be exemplified by, e.g., methoxy groups, ethoxy groups, n-propoxy groups, and isopropoxy groups, of which methoxy groups and ethoxy groups are preferable.

At least two groups designated by $R^1$ in one molecule are the following: alkenyl groups, hydrogen atoms, halogen atoms, epoxy-containing organic groups, acryl- or methacryl-containing organic groups, amino-containing organic groups, mercapto-containing organic groups, alkoxy groups, or hydroxy groups.

Furthermore, "a", "b", "c", and "d" are numbers that are equal to or greater than 0 and are equal to or lower than 1. These numbers should satisfy the following condition: "a+b+c+d=1". However, "a", "b", "c" cannot be equal to 0 altogether at the same time.

The siloxane described above should contain in its structure at least one of the following structural units: $(R^1{}_3SiO_{1/2})$, $(R^1{}_2SiO_{2/2})$, $(R^1SiO_{3/2})$ and $(SiO_{4/2})$. For example, this can be a linear-chained polysiloxane consisting of $(R^1{}_3SiO_{1/2})$ and $(R^1{}_2SiO_{2/2})$ units; a cyclic polysiloxane consisting of $(R^1{}_2SiO_{2/2})$ units; a branch-chained polysiloxane comprising $(R^1SiO_{3/2})$ or $(SiO_{4/2})$ units; a polysiloxane consisting of $(R^1{}_3SiO_{1/2})$ and $(R^1SiO_{3/2})$ units; a polysiloxane consisting of $(R^1{}_3SiO_{1/2})$ and $(SiO_{4/2})$ units; a polysiloxane consisting of $(R^1SiO_{3/2})$ and $(SiO_{4/2})$ units; a polysiloxane consisting of $(R^1{}_2SiO_{2/2})$ and $(R^1SiO_{3/2})$ units; a polysiloxane consisting of $(R^1{}_2SiO_{2/2})$ and $(SiO_{4/2})$ units; a polysiloxane consisting of $(R^1{}_3SiO_{1/2})$, $(R^1{}_2SiO_{2/2})$, and $(R^1SiO_{3/2})$ units; a polysiloxane consisting of $(R^1{}_3SiO_{1/2})$, $(R^1{}_2SiO_{2/2})$, and $(SiO_{4/2})$ units; a polysiloxane consisting of $(R^1{}_3SiO_{1/2})$, $(R^1SiO_{3/2})$, and $(SiO_{4/2})$ units; a polysiloxane consisting of $(R^1{}_2SiO_{2/2})$, $(R^1SiO_{3/2})$, and $(SiO_{4/2})$ units; and a polysiloxane composed of $(R^1{}_3SiO_{1/2})$, $(R^1{}_2SiO_{2/2})$, $(R^1SiO_{3/2})$, and $(SiO_{4/2})$ units. It is recommended that the number of repetitions of the structural units represented by formulae $(R^1{}_3SiO_{1/2})$, $(R^1{}_2SiO_{2/2})$, $(R^1SiO_{3/2})$, and $(SiO_{4/2})$ be in the range of 1 to 10,000, preferably 1 to 1,000, and more preferably 3 to 500.

The aforementioned siloxanes can be prepared by methods known in the art. There are no special restrictions with regard to the method for preparation of these siloxanes but the most general method comprises hydrolysis of an organochlorosilanes. These and other methods are disclosed by Noll in: *Chemistry and Technology of Silicones*, Chapter 5 (Translated 2$^{nd}$ German Issue, Academic Press, 1968).

The aforementioned siloxanes can be copolymerized with other polymers. For example, the following copolymers can be obtained: a copolymer having Si—O—Si and Si—Si bonds; a copolymer having Si—O—Si and Si—N—Si bonds; a copolymer having Si—O—Si and Si—$(CH_2)_n$—Si bonds; a copolymer having Si—O—Si and Si—$(C_6H_4)_n$—Si bonds, or similar siloxanes. In the formulae, "n" has the same meaning as defined above.

Furthermore, the silanes can be represented by the following general formula:

$$R^1{}_4Si,$$

or by the following average unit formula:

$$(R^1{}_3Si)_a(R^1{}_2Si)_b(R^1Si)_c(Si)_d$$

wherein $R^1$ may be the same or different and may be selected from substituted or unsubstituted monovalent hydrocarbon groups, hydrogen atoms, halogen atoms, epoxy-containing organic groups, acryl- or methacryl-containing organic groups, amino-containing organic groups, mercapto-containing organic groups, alkoxy groups, and hydroxy groups; however, at least one $R^1$ in a molecule should comprise an alkenyl group, a hydrogen atom, a halogen atom, an epoxy-containing organic group, an acryl- or methacryl-containing organic group, an amino-containing organic group, a mercapto-containing organic group, an alkoxy group, or a hydroxy group; "a", "b", "c", and "d" are numbers that are equal to or greater than 0 and are equal to or lower than 1, and that satisfy the following condition: "a+b+c+d=1"; however, "a", "b" and "c" cannot be equal to 0 altogether at the same time. In the above formula, "$R^1$", "a", "b", "c", and "d" are the same as defined above.

The silanes are represented either by a general formula: $R^1{}_4Si$, or by a structure consisting of at least one of the structural units represented by the following formulae: $(R^1{}_3Si)$, $(R^1{}_2Si)$, $(R^1Si)$, and $(Si)$. For example, this can be a linear-chained polysilane consisting of $(R^1{}_3Si)$ and $(R^1{}_2Si)$ units; a cyclic polysilane consisting of $(R^1{}_2Si)$ units; a branch-chained polysilane (polysilyn) comprising $(R^1Si)$ or $(Si)$ units; a polysilane consisting of $(R^1{}_3Si)$ and $(R^1Si)$ units; a polysilane consisting of $(R^1{}_3Si)$ and $(Si)$ units; a polysilane consisting of $(R^1Si)$ and $(Si)$ units; a polysilane consisting of $(R^1{}_2Si)$ and $(R^1Si)$ units; a polysilane consisting of $(R^1{}_2Si)$ and $(Si)$ units; a polysilane consisting of $(R^1{}_3Si)$, $(R^1{}_2Si)$, and $(R^1Si)$ units; a polysilane consisting of $(R^1{}_3Si)$, $(R^1{}_2Si)$, and $(Si)$ units; a polysilane consisting of $(R^1{}_3Si)$, $(R^1Si)$, and $(Si)$ units; a polysilane consisting of $(R^1{}_2Si)$, $(R^1Si)$, and $(Si)$ units; and a polysilane consisting of $(R^1{}_3Si)$, $(R^1{}_2Si)$, $(R^1Si)$, and $(Si)$ units. It is recommended that the number of repetitions of the structural units represented by formulae $(R^1{}_3Si)$, $(R^1{}_2Si)$, $(R^1Si)$, and $(Si)$ be in the range of 2 to 10,000, preferably 3 to 1,000, and more preferably 3 to 500.

The aforementioned silanes can be prepared by methods known in the art. For example, they can be obtained by a method based on dehalogenation of halosilanes in the presence of an alkali metal (see *Journal of American Chemical Society*, 110, 124 (1988); *Macromolecules*, 23, 3423 (1990), etc.; a method based on anionic polymerization of a disilene (*Macromolecules*, 23, 4494 (1990), etc.; a method based on dehalogenation of halosilanes by electrode reduction (see *Journal of Chemical Society Chem. Commun.*, 1161, (1990); *Journal of Chemical Society Chem Commun.*, 897 (1992), etc.; a method based on dehalogenation of halosilanes in the presence of magnesium (International Patent Application Publication WO 98/29476, etc.); and a method based on dehydrogenation of halosilanes in the presence of a metal catalyst (Kokai H04-334551).

The above-described silanes can be copolymerized with other polymers. The copolymers may be exemplified, e.g., by a copolymer having Si—Si and Si—O—Si bonds; a copolymer having Si—Si and Si—N—Si bonds; a copolymer having Si—Si and Si—(CH$_2$)$_n$—Si bonds; and a copolymer having Si—Si and Si—(C$_6$H$_4$)$_n$—Si bonds.

The silazanes are represented, e.g., by the following average unit formula:

$$(R^1{}_3SiNR^2)_a(R^1{}_2SiNR^2)_b(R^1SiNR^2)_c(SiNR^2)_d$$

wherein $R^1$ may be the same or different and may be selected from substituted or unsubstituted monovalent hydrocarbon groups, hydrogen atoms, halogen atoms, epoxy-containing organic groups, acryl- or methacryl-containing organic group, amino-containing organic groups, mercapto-containing organic groups, alkoxy groups, and hydroxy groups; however, at least one $R^1$ in a molecule should comprise an alkenyl group, a hydrogen atom, a halogen atom, an epoxy-containing organic group, an acryl- or methacryl-containing organic group, an amino-containing organic group, a mercapto-containing organic group, an alkoxy group, or a hydroxy group; $R^2$ is a hydrogen atom, or substituted or unsubstituted monovalent hydrocarbon group; "a", "b", "c", and "d" are numbers that are equal to or greater than 0 and are equal to or lower than 1, and that satisfy the following condition: "a+b+c+d=1"; however, "a", "b" and "c" cannot be equal to 0 altogether at the same time. In the above formula, "$R^1$", "a", "b", "c", and "d" are the same as defined above. Monovalent hydrocarbon groups designated by $R^2$ are the same monovalent hydrocarbon group as those exemplified for $R^1$. It is preferable that groups designated by $R^2$ are alkyl groups or hydrogen atoms, in particular methyl groups and hydrogen atoms.

The silazanes are represented by a structure consisting of at least one of the structural units represented by the following formulae: $(R^1{}_3SiNR^2)$, $(R^1{}_2SiNR^2)$, $(R^1SiNR^2)$, and $(SiNR^2)$. For example, this can be a linear-chained polysilazane consisting of $(R^1{}_3SiNR^2)$ and $(R^1{}_2SiNR^2)$ units, a cyclic polysilazane consisting of $(R^1{}_2SiNR^2)$ units; a branch-chained polysilazane comprising $(R^1SiNR^2)$ or $(SiNR^2)$ units; a polysilazane consisting of $(R^1{}_3SiNR^2)$ and $(R^1SiNR^2)$ units; a polysilazane consisting of $(R^1{}_3SiNR^2)$ and $(SiNR^2)$ units; a polysilazane consisting of $(R^1SiNR^2)$ and $(SiNR^2)$ units; a polysilazane consisting of $(R^1{}_2SiNR^2)$ and $(R^1SiNR^2)$ units; a polysilazane consisting of $(R^1{}_2SiNR^2)$ and $(SiNR^2)$ units; a polysilazane consisting of $(R^1{}_3SiNR^2)$, $(R^1{}_2SiNR^2)$, and $(R^1SiNR^2)$ units; a polysilazane consisting of $(R^1{}_3SiNR^2)$, $(R^1{}_2SiNR^2)$, and $(SiNR^2)$ units; a polysilazane consisting of $(R^1{}_3SiNR^2)$, $(R^1SiNR^2)$, and $(SiNR^2)$ units; a polysilazane consisting of $(R^1{}_2SiNR^2)$, $(R^1SiNR^2)$, and $(SiNR^2)$ units; and a polysilazane consisting of $(R^1{}_3SiNR^2)$, $(R^1{}_2SiNR^2)$, $(R^1SiNR^2)$, and $(SiNR^2)$ units. It is recommended that the number of repetitions of the structural units represented by formulae $(R^1{}_3SiNR^2)$, $(R^1{}_2SiNR^2)$, $(R^1SiNR^2)$, and $(SiNR^2)$ be in the range of 2 to 10,000, preferably 3 to 1,000, and more preferably 3 to 500.

The aforementioned silazanes can be prepared by methods known in the art. These methods are disclosed in the following patent references: U.S. Pat. Nos. 4,312,970, 4,340,619, 4,395,460, 4,404,153, 4,482,689, 4,397,828, 4,540,803, 4,543,344, 4,835,238, 4,774,312, 4,929,742, and 4,916,200. The methods are also disclosed by Burns, et al. in: *Journal of Material Science*, 22 (1987), pp. 2609-2614.

These silazanes can be copolymerized with other polymers. The following are examples of copolymers that can be used as silazanes: a copolymer having Si—N—Si and Si—O—Si bonds; a copolymer having Si—N—Si and Si—Si bonds; a copolymer having Si—N—Si and Si—(CH$_2$)$_n$—Si bonds; and a copolymer having Si—N—Si and Si—(C$_6$H$_4$)$_n$—Si bonds. In the formulae, "n" has the same meaning as defined above.

The carbosilanes are represented, e.g., by the following average unit formula:

$$(R^1{}_3SiR^3)_a(R^1{}_2SiR^3)_b(R^1SiR^3)_c(SiR^3)_d$$

wherein $R^1$ may be the same or different and may be selected from substituted or unsubstituted monovalent hydrocarbon groups, hydrogen atoms, halogen atoms, epoxy-containing organic groups, acryl- or methacryl-containing organic group, amino-containing organic groups, mercapto-containing organic groups, alkoxy groups, and hydroxy groups; however, at least one $R^1$ in a molecule should comprise an alkenyl group, a hydrogen atom, a halogen atom, an epoxy-containing organic group, an acryl- or methacryl-containing organic group, an amino-containing organic group, a mercapto-containing organic group, an alkoxy group, or a hydroxy group; $R^3$ is an alkylene group or an arylene group, "a", "b", "c", and "d" are numbers that are equal to or greater than 0 and are equal to or lower than 1, and that satisfy the following condition: "a+b+c+d=1"; however, "a", "b" and "c" cannot be equal to 0 altogether at the same time. In the above formula, "$R^1$", "a", "b", "c", and "d" are the same as defined above. Alkylene groups designated by $R^3$ may be represented, e.g., by formula: —(CH$_2$)$_n$—, and the arylene group designated by $R^3$ can be represented by formula: —(C$_6$H$_4$)$_n$—, wherein "n" has the same meaning as defined above.

The aforementioned carbosilanes are represented by a structure consisting of at least one of the structural units represented by the following formulae: $(R^1{}_3SiR^3)$, $(R^1{}_2SiR^3)$, $(R^1SiR^3)$, and $(SiR^3)$. For example, this can be a linear-chained carbosilane consisting of $(R^1{}_3SiR^3)$ and $(R^1{}_2SiR^3)$ units, a cyclic carbosilane consisting of $(R^1{}_2SiR^3)$ units; a branch-chained carbosilane comprising $(R^1SiR^3)$ or $(SiR^3)$ units; a carbosilane consisting of $(R^1{}_3SiR^3)$ and $(R^1SiR^3)$ units; a carbosilane consisting of $(R^1{}_3SiR^3)$ and $(SiR^3)$ units; a carbosilane consisting of $(R^1SiR^3)$ and $(SiR^3)$ units; a carbosilane consisting of $(R^1{}_2SiR^3)$ and $(R^1SiR^3)$ units; a carbosilane consisting of $(R^1{}_2SiR^3)$ and $(SiR^3)$ units; a carbosilane consisting of $(R^1{}_3SiR^3)$, $(R^1{}_2SiR^3)$, and $(R^1SiR^3)$ units; a carbosilane consisting of $(R^1{}_3SiR^3)$, $(R^1{}_2SiR^3)$, and $(SiR^3)$ units; a carbosilane consisting of $(R^1{}_3SiR^3)$, $(R^1SiR^3)$, and $(SiR^3)$ units; a carbosilane consisting of $(R^1{}_2SiR^3)$, $(R^1SiR^3)$, and $(SiR^3)$ units; and a carbosilane consisting of $(R^1{}_3SiR^3)$, $(R^1{}_2SiR^3)$, $(R^1SiR^3)$, and $(SiR^3)$ units. It is recommended that the number of repetitions of the structural units represented by formulae $(R^1{}_3SiR^3)$, $(R^1{}_2SiR^3)$, $(R^1SiR^3)$, and $(SiR^3)$ be in the range of 2 to 10,000, preferably 3 to 1,000, and more preferably 3 to 500.

The aforementioned carbosilanes can be prepared by methods known in the art. Such methods are described, e.g., in the following publications: J. Dunogue, et al., *Micromolecules*, 21, 30 (1988); U.S. Pat. No. 3,293,194; N.S. Nametkin, et al. *Dokl. Akad. Nauk SSSR [Transactions of the USSR Academy of Sciences]* 28, 1112 (1973); W.A. Kriner, Journal of Polymer Science, Part. A-1. 4, 444 (1966); N.S. Nametkin, et al. *Dokl. Akad. Nauk SSSR [Transactions of the USSR Academy of Sciences]* 170, 1088 (1966); and C.S. Cundy, C. Eaborn, M.F. Lappert, J. Organomet. Chemistry 44 (2), 291 (1972).

These carbosilanes can be copolymerized with other polymers. The following are examples of copolymers that can be used as carbosilanes: a copolymer having Si—(CH$_2$)$_n$—Si and Si—O—Si bonds; a copolymer having Si—(CH$_2$)$_n$—Si and Si—Si bonds; a copolymer having Si—(CH$_2$)$_n$—Si and Si—N—Si bonds; a copolymer having Si—(CH$_2$)$_n$—Si and Si—(C$_6$H$_4$)$_n$—Si and Si—O—Si bonds; a copolymer having Si—(C$_6$H$_4$)$_n$—Si and Si—Si bonds; and a copolymer having Si—(C$_6$H$_4$)$_n$—Si and Si—N—Si bonds. In the formulae, "n" has the same meaning as defined above.

The are no special restrictions with regard to the form in which the aforementioned siloxanes, silanes, silazanes, and carbosilanes are used, and at room temperature these compounds may be in a solid, liquid, or a paste-like form. The curable silicon-containing compound used in the process of the present invention may comprise the aforementioned siloxane.

The curable silicon-containing compound can be cured by means of an addition reaction, condensation reaction, ring-opening reaction, or a radical reaction. Preferable are processes, in which one molecule contains one or more groups that possess addition-reaction properties, condensation-reaction properties, ring-opening properties, or radical-reaction properties per 10 silicon atoms. The groups with addition-reaction properties may be represented by alkenyl groups, hydrogen atoms, and mercapto-containing organic groups that were earlier designated by $R^1$. The groups with condensation-reaction properties may comprise those hydrogen atoms, halogen atoms, amino-containing organic groups, alkoxy groups, and hydroxy groups that were earlier designated by $R^1$. The groups with ring-opening properties are epoxy-containing organic groups that were designated by $R^1$. The groups with radical-reaction properties are alkenyl groups, acryl- or methacryl-containing organic groups that were earlier designated by $R^1$.

If curing of the silicon-containing compound cannot be easily performed with the process of the present invention, or if the curing by the process proceeds with delay, it is recommended to add a curing agent or a curing catalyst intended for the compound. For example, when the alkenyl groups are present in one molecule of the compounds such as siloxanes represented by the following average unit formula:

$$(R^1{}_3SiO_{1/2})_a(R^1{}_2SiO_{2/2})_b(R^1SiO_{3/2})_c(SiO_{4/2})_d$$

wherein $R^1$ may be the same or different and may be selected from substituted or unsubstituted monovalent hydrocarbon groups, hydrogen atoms, halogen atoms, epoxy-containing organic groups, acryl- or methacryl-containing organic group, amino-containing organic groups, mercapto-containing organic groups, alkoxy groups, and hydroxy groups; and wherein, at least two groups designated by $R^1$ in a molecule comprise alkenyl groups, "a", "b", "c", and "d" are numbers that are equal to or greater than 0 and are equal to or lower than 1, and that satisfy the following condition: "a+b+c+d=1"; however, "a", "b" and "c" cannot be equal to 0 altogether at the same time, then the curing agent for such a composition may be exemplified by a combination of a hydrosilylation-reaction catalyst with a silicon-containing compound having in its molecule at least two silicon-bonded hydrogen atoms.

The alkenyl groups used in the silicon-containing compound may be exemplified by the same alkenyl groups that have been designated by $R^1$, of which vinyl groups are preferable. The aforementioned silicon-containing compound may have a linear-chained, branch-chained, cyclic, net-like, or partially branched linear molecular structure. There are no special restrictions with regard to the form of the silicon-containing compound, so this compound may be liquid or solid at 25° C.

The aforementioned silicon-containing compound that has in one molecule at least two silicon-bonded hydrogen atoms may be represented by siloxanes of the following average unit formula:

$$(R^4{}_3SiO_{1/2})_a(R^4{}_2SiO_{2/2})_b(R^4SiO_{3/2})_c(SiO_{4/2})_d$$

wherein $R^4$ may be the same or different and may be selected from substituted or unsubstituted monovalent hydrocarbon groups which are free of unsaturated aliphatic bonds, as well as by hydrogen atoms, alkoxy groups, or hydroxy groups; and wherein, at least two groups designated by $R^4$ in a molecule comprise hydrogen atoms; "a", "b", "c", and "d" are numbers that are equal to or greater than 0 and are equal to or lower than 1, and that satisfy the following condition: "a+b+c+d=1"; however, "a", "b" and "c" cannot be equal to 0 altogether at the same time, and by silicon bonded-compounds of the following general formula:

$$[(R^5)_2HSi]_eR^6$$

wherein $R^5$ are the same or different, substitute or unsubstituted monovalent hydrocarbon groups; "e" is an integer equal to or greater than 2; and $R^6$ is an e-valent organic group.

In the first-mentioned siloxane, the monovalent hydrocarbon groups designated by $R^4$ can be exemplified by the same monovalent hydrocarbon groups that were earlier designated by $R^1$. The alkoxy groups designated by $R^4$ can be exemplified by the same alkoxy groups that were earlier designated by $R^1$. In the first-mentioned siloxanes, in one molecule at least two groups designated by $R^4$ are hydrogen atoms; "a", "b", "c", and "d" are numbers that are equal to or greater than 0 and that are equal to or lower than 1; and that satisfy the following condition: "a+b+c+d=1"; however, "a", "b" and "c" cannot be equal to 0 altogether at the same time. Such siloxanes may have a linear-chained, branch-chained, cyclic, net-like, or partially branched linear molecular structure. The linear-chained molecular structure is preferable. These siloxanes may have a 25° C. viscosity in the range of 1 to 500,000 mPa·s, and preferably in the range of 1 to 10,000 mPa·s.

The monovalent hydrocarbon groups designated by $R^5$ and used in the second-mentioned silicon-containing compounds may be the same monovalent hydrocarbon groups as those designated earlier by $R^1$; "e" is an integer equal to or greater than 2; when "e" is 2, the two-valent organic groups designated by $R^6$ may be represented by alkylene groups, alkenylene groups, alkyleneoxyalkylene groups, arylene groups, and aryleneoxyarylene groups, arylenealkylenearylene groups. Specific examples of such groups are the following: —CH$_2$CH$_2$—, —CH$_2$CH$_2$CH$_2$—, —CH$_2$CH(CH$_3$)—, —CH═CH—, —C≡C—, —CH$_2$CH$_2$OCH$_2$CH$_2$—, —CH$_2$CH$_2$CH$_2$OCH$_2$CH$_2$—,

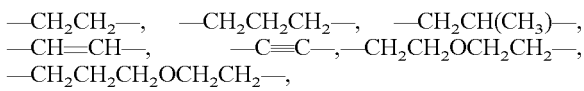

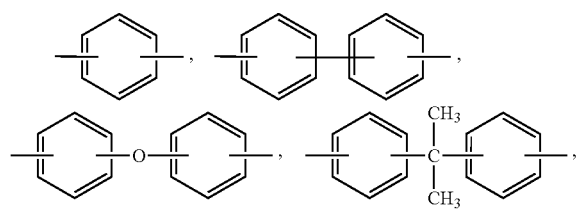

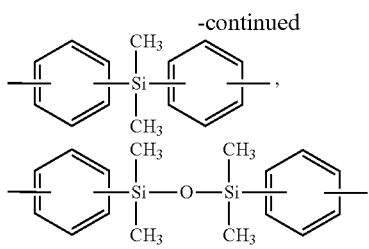

When "e" is 3, the trivalent organic groups designated by $R^6$ can be represented by the following specific examples:

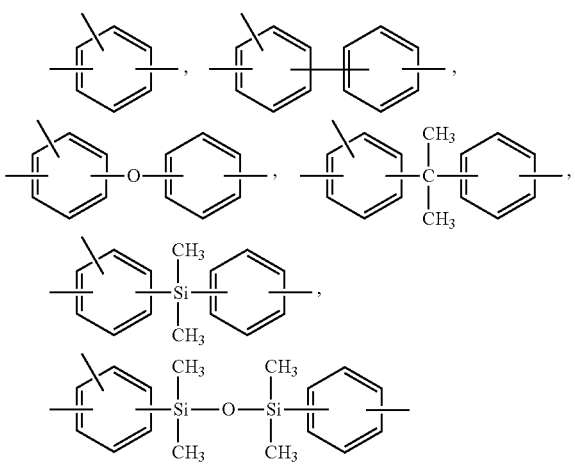

The silicon-containing compound that has at least two silicon-bonded hydrogen atoms in one molecule is used in an amount such that the content of silicon-bonded hydrogen atoms of this component in the range of 0.1 to 50 moles, preferably 0.1 to 30 moles, and even more preferably 0.1 to 10 moles, per 1 mole of alkenyl groups in the silicon-containing compound that has alkenyl groups. If the added amount of the silicon-containing compound is lower than the recommended lower limit, it will be difficult to form the silicon-containing particles. If, on the other hand, the added amount exceeds the recommended upper limit, there is possibility of changes in the physical properties of the obtained silicon-containing particles in time.

The hydrosilylation-reaction catalyst may be exemplified, e.g., by fine platinum powder, platinum black, platinum on fine silica powder, platinum on an activated-coal carrier, chloroplatinic acid, platinum tetrachloride, alcoholic solution of chloroplatinic acid, an olefin complex of platinum, and an alkenylsiloxane complex of platinum. There are no special restrictions with regard to the amount in which the hydrosilylation-reaction catalyst can be used. It can be recommended, however, to use the catalyst in such an amount that in terms of weight the content of metallic platinum in the catalyst is in the range of 0.1 to 1,000 ppm, and preferably in the range of 1 to 500 ppm.

When the aforementioned silicon-containing compound contains in one molecule at least two silicon-bonded hydrogen atoms, the curing agent may comprise a combination of a hydrosilylation-reaction catalyst with a compound that has in one molecule at least two unsaturated aliphatic bonds.

The compound that has in one molecule at least two unsaturated aliphatic bonds may be exemplified by the following: an aliphatic hydrocarbon compound having unsaturated aliphatic bonds on molecular terminals and/or in side molecular chains; an aliphatic hydrocarbon compound having unsaturated aliphatic bonds on molecular terminals and/or in side molecular chains and hetero-atoms in the molecular chain; an aromatic hydrocarbon compound having unsaturated aliphatic bonds in a molecule; and a cyclic compound that has in its molecule unsaturated aliphatic bonds and hetero-atoms.

The hydrocarbon compounds with unsaturated aliphatic bonds can be represented by the following formulae:

$$R^7-(CH_2)_x-R^7$$

$$CH_3-(CHR^7)_x-(CH_2)_y-CH_3$$

$$CH_3-(CH_2)_x-(CH=CH)_y-CH_3$$

$$CH_3-(CH_2)_x-(C\equiv C)_y-CH_3$$

$$R^7-O(CH_2CH_2O)_x-(CH_2CH_2CH_2O)_y-R^7$$

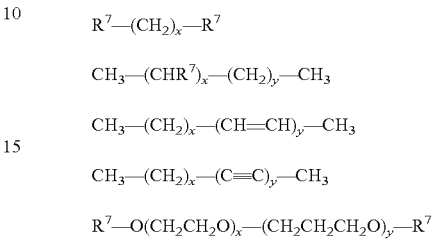

In theses formulae, $R^7$ designates a monovalent hydrocarbon group having unsaturated aliphatic bonds. Specific examples of such groups are the following: vinyl groups, propenyl groups, butenyl groups, pentenyl groups, hexenyl groups, or similar alkenyl groups. In the formulas, "x" and "y" are integers equal to or greater than 1; and "z" is an integer in the range of 2 to 6.

The aromatic hydrocarbon compound can be specifically represented by compounds of the following general formula:

$$(R^7)_w R^8$$

In this formula, $R^7$ designates monovalent hydrocarbon groups, which are the same respective groups as defined above. In this formula, "w" is an integer equal to or greater than 2. When "w" is 2, $R^8$ is a bivalent aromatic hydrocarbon group. Specific example of such groups is shown by the following formulae:

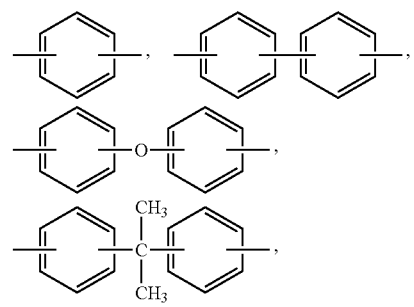

When "w" is 3, $R^8$ designates trivalent aromatic hydrocarbon groups, which can be represented by the following formulae:

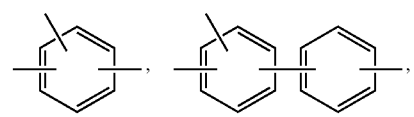

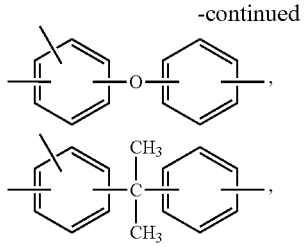

Furthermore, the aromatic hydrocarbon compound having heteroatoms can be represented by the following formula:

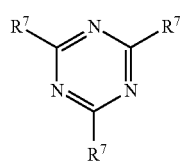

In this formula, $R^7$ designates monovalent hydrocarbon groups having unsaturated aliphatic bonds. These groups are the same as exemplified above.

The cyclic compounds having hetero-atoms can be exemplified, e.g., by compounds of the following formula:

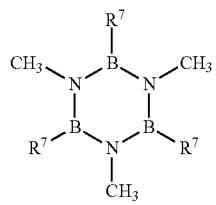

In this formula, $R^7$ designates monovalent hydrocarbon groups having unsaturated aliphatic bonds which are the same as those exemplified above.

When the silicon-containing compounds are siloxanes that contain in one molecule at least two silicon-bonded hydroxyl groups and that are represented by the following average unit formula:

$$(R^1{}_3SiO_{1/2})_a(R^1{}_2SiO_{2/2})_b(R^1SiO_{3/2})_c(SiO_{4/2})_d$$

wherein $R^1$ may be the same or different and may be selected from substituted or unsubstituted monovalent hydrocarbon groups, hydrogen atoms, halogen atoms, epoxy-containing organic groups, acryl- or methacryl-containing organic groups, amino-containing organic groups, mercapto-containing organic groups, alkoxy groups, and hydroxy groups; however, at least two groups designated by $R^1$ in a molecule should comprise hydroxy groups; "a", "b", "c", and "d" are numbers that are equal to or greater than 0 and are equal to or lower than 1, and that satisfy the following condition: "a+b+c+d=1"; however, "a", "b" and "c" cannot be equal to 0 altogether at the same time, then the curing agent may comprise a combination of a condensation-reaction catalyst with a silicon-containing compound that contains in one molecule at least two silicon-bonded hydrogen atoms.

Such silicon-containing compounds may have a linear-chained, branch-chained, cyclic, net-like, or partially branched linear molecular structure. The linear-chained molecular structure is preferable. These compounds may have a 25° C. viscosity in the range of 1 to 500,000 mPa·s, and preferably in the range of 1 to 100,000 mPa·s.

The silicon-containing compounds that have in one molecule at least two silicon-bonded hydrogen atoms are the same as those exemplified earlier. It is recommended that such a compound be used in an amount of 0.1 to 10, preferably, 0.1 to 5 parts by weight per 100 parts of the earlier mentioned silicon-containing compound.

The condensation-reaction catalyst is represented by tin naphthanate, tin octoate, tin oleate, tin butyrate, titanium naphthanate, zinc naphthanate, cobalt naphthanate, zinc stearate, butyltin-tri-2-ethylhexoate, dibutyltin diacetate, dibutyltin dilaurate, dibutyltin dioctate, dibutyltin diolate, lead-2-ethylhexanoate, zinc-2-ethylhexanoate, or similar metal salts of a carboxylic acid; tetrabutyl titanate, tetra-2-ethylhexyl titanate, tetraoctadecyl titanate, tetraphenyl titanate, tetra(isopropenyloxy) titanate, or a similar organic titanic acid esters.

These condensation-reaction catalysts are arbitrary components, which can be used in an amount of 5 parts by weight or less per 100 parts by weight of the aforementioned silicon-containing compound.

When the silicon-containing compounds are siloxanes that contain in one molecule at least two silicon-bonded alkoxy groups and that are represented by the following average unit formula:

$$(R^1{}_3SiO_{1/2})_a(R^1{}_2SiO_{2/2})_b(R^1SiO_{3/2})_c(SiO_{4/2})_d$$

wherein $R^1$ may be the same or different and may be selected from substituted or unsubstituted monovalent hydrocarbon groups, hydrogen atoms, halogen atoms, epoxy-containing organic groups, acryl- or methacryl-containing organic groups, amino-containing organic groups, mercapto-containing organic groups, alkoxy groups, and hydroxy groups; however, at least two groups designated by $R^1$ in a molecule should comprise alkoxy or hydroxy groups; "a", "b", "c", and "d" are numbers that are equal to or greater than 0 and are equal to or lower than 1, and that satisfy the following condition: "a+b+c+d=1"; however, "a", "b" and "c" cannot be equal to 0 altogether at the same time, then the curing agent may comprise a hydrolysable silane represented by the formula given below, or a condensate of partial hydrolyzation of the aforementioned silane, or a combination of these compounds with the condensation-reaction catalyst:

$$R^9{}_xSWiX_{(4-x)}$$

wherein $R^9$ are selected from substituted or unsubstituted monovalent hydrocarbon groups, epoxy-containing organic groups, acryl- or methacryl-containing organic groups, amino-containing organic groups, or mercapto-containing organic groups; "X" designate hydrolysable groups, and "x" is 0 or 1.

The silicon-bonded alkoxy groups used in the silicon-bonded compound may be exemplified by the same alkoxy groups that were designated earlier by $R^1$, e.g., these may be methoxy or ethoxy groups. Such silicon-containing compounds may have a linear-chained, branch-chained, cyclic, net-like, or partially branched linear molecular structure. The linear-chained molecular structure is preferable. These compounds may have a 25° C. viscosity in the range of 1 to 500,000 mPa·s, and preferably in the range of 1 to 100,000 mPa·s.

The monovalent hydrocarbon groups contained in the aforementioned hydrolysable silanes and designated by $R^9$ may be exemplified by the same alkenyl groups and monovalent hydrocarbon groups that were designated by $R^1$, of which the alkyl groups are preferable. Furthermore, the epoxy-containing organic groups designated by $R^9$ may be exemplified by the same epoxy-containing organic groups that were designated by $R^1$, while the acryl- and methacryl-containing organic groups designated by $R^9$ may be exemplified by the same acryl- and methacryl-containing organic groups that were designated by $R^1$. The amino-containing organic groups may be exemplified by the same amino-containing organic groups that were designated by $R^1$, and the mercapto-containing organic groups may be exemplified by the same mercapto-containing organic groups that were designated by $R^1$. In the above formula, "X" designates hydrolysable groups, such as alkoxy groups, acetoxy groups, aminoxy groups, and oxime groups; "x" is 0 or 1.

The aforementioned hydrolysable silanes or condensates of their partial hydrolyzation are exemplified by the following compounds: methyl silicate, ethyl silicate, methyl cellosolve orthosilicate, n-propyl orthosilicate, or similar alkyl silicates; methyl trimethoxysilane, ethyl trimethoxysilane, methyl triethoxysilane, vinyl trimethoxysilane, aminomethyl triethoxysilane, 3-aminopropyl triethoxysilane, 3-aminopropyl methyldimethoxysilane, N-(2-aminorthyl)aminomethyl tributoxysilane, N-(2-aminoethyl)-3-aminopropyl trimethoxysilane, N-(2-aminoethyl)-3-aminopropyl methyldimethoxysilane, 3-anilinopropyl triethoxysilane, 3-glycidoxypropyl trimethoxysilane, 3-glycidoxypropyl methyldimethoxysilane, 2-(3,4-epoxycyclohexyl)ethyltrimethoxysilane, 2-(3,4-epoxycyclohexyl)ethylmethyldimethoxysilane, or similar alkoxysilanes; methyl triacetoxysilane, ethyl triacetoxysilane, vinyl triacetoxysilane, or similar acetoxysilanes; methyl tris(dimethylketoximino)silane, methyl tris(methylethylketoximino)silane, methyl tris(methylpropylketoximino)silane, methyl tris(methylisobutylketoximino)silane, ethyl tris(dimethylketoximino)silane, ethyl tris(methylethylketoximino)silane, ethyl tris(methylpropylketoximino)silane, ethyl tris(methylisobutylketoximino)silane, vinyl tris(dimethylketoximino)silane, vinyl tris(methylethylketoximino)silane, vinyl tris(methylpropylketoximino)silane, vinyl tris(methylisobutylketoximino)silane, tetrakis(dimethylketoximino)silane, tetrakis(methylethylketoximino)silane, tetrakis(methylpropylketoximino)silane, tetrakis(methylisobutylketoximino)silane, or similar ketoximinosilanes.

The aforementioned hydrolysable silanes or condensates of their partial hydrolyzation can be used in amounts of 0.1 to 10 parts by weight, preferably 0.1 to 5 parts by weight per 100 parts by weight of the aforementioned silicon-containing compounds.

The condensation reaction catalysts may be the same as listed above. Such a condensation reaction catalyst is an arbitrary component, which can be used in an amount of 5 parts by weight or less per 100 parts by weight of the silicon-containing compound.

When the silicon-containing compounds are siloxanes that contain in one molecule at least one epoxy-containing organic group and that are represented by the following average unit formula:

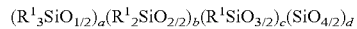

$$(R^1{}_3SiO_{1/2})_a(R^1{}_2SiO_{2/2})_b(R^1SiO_{3/2})_c(SiO_{4/2})_d$$

wherein $R^1$ may be the same or different and may be selected from substituted or unsubstituted monovalent hydrocarbon groups, hydrogen atoms, halogen atoms, epoxy-containing organic groups, acryl- or methacryl-containing organic groups, amino-containing organic groups, mercapto-containing oranic groups, alkoxy groups, and hydroxy groups; however, at least one group designated by $R^1$ in a molecule should comprise an epoxy-containing organic group; "a", "b", "c", and "d" are numbers that are equal to or greater than 0 and are equal to or lower than 1, and that satisfy the following condition: "a+b+c+d=1"; however, "a", "b" and "c" cannot be equal to 0 altogether at the same time, then the curing agents may be exemplified by those curing agents that are used for epoxy resins.

The epoxy-containing organic groups used in the aforementioned silicon-containing compounds can be exemplified by the same epoxy-containing organic groups that were earlier designated by $R^1$. These may be, e.g., glycidoxyalkyl groups. The aforementioned silicon-containing compounds may have a linear-chained, branch-chained, cyclic, net-like, or partially branched linear molecular structures. There are no special restrictions with regard to the form of the silicon-containing compounds that may be liquid or solid at 25° C.

The curing agents for epoxy resins may be exemplified by acid anhydrides, phenol compounds, amine compounds, organometallic compounds of aluminum, zirconium, or other metals, phosphines, or other phosphorous compounds, boron complex compounds, organic ammonium salts, organic sulphonium salts, and other onium salts.

The acid anhydride may be exemplified by succinic anhydride, maleic anhydride, itaconic anhydride, octenyl succinic anhydride, dodecyl succinic anhydride, phthalic anhydride, tetrrahydrophthalic anhydride, hexyhydrophthalic anhydride, methyltetrahydrophthalic anhydride, methylhexahydrophthalic anhydride, tetrabromophthalic anhydride, 5-norbornene-2,3-dicarboxylic anhydride, methylnadic anhydride, dodecyl succinic anhydride, chlorendic anhydride, trialkyltetrahydrophthalic anhydride, diphenic anhydride, pyromellitic anhydride, benzophnenonetetracarboxylic anhydride, ethylenglycol bis(anhydrotrimellitate), methylcyclohexene-tetracarboxylic anhydride, biphenyltetracarboxylic anhydride, diphenylether-tetracarboxylic anhydride, butanetetracarboxylic dianhydride, cyclopentanetetracarboxylic anhydride, benzophenonetetracarboxylic anhydride, bicycle[2,2,2]oct-7-ene-2,3,5,6-tetracarboxylic anhydride, β,γ-aconitic anhydride, glycolic anhydride, trimellitic anhydride, and polyazelaic acid anhydride.

The amino compounds can be exemplified by the following compounds: octylamine, ethylamine, hexylamine, dioctylamine, triethylamine, trihexylamine, triethylenetetramine, ethylenediamine, dimethylethylenediamine, benzyldimethylamine, α-methylbenzyl dimethylamine, 1,8-diazabicyclo[5.4.0]undec-7-ene, or similar amines; aminoethyl-aminopropyl-methyldimethoxysilane, or similar aminosilanes; and amino-containing siloxane polymers.

The organophosphorous compounds can be exemplified by triphenylphosphine, tributylphosphine, tri(p-methylphenyl)phosphine, tri(nonylphenyl)phosphine, triphenyl phosphine-triphenylborate, and tetraphenylphosphine-tetraphenylborate.

The onium salts can be exemplified by phosphonium salt, iodonium salt, and sulfonium salt.

The phosphonium salts can be exemplified by benzyltriphenyl phosphonium chloride, benzyltriphenyl phosphonium bromide, benzyltriphenyl phosphonium tetrafluoroboride, antimonybenzyl triphenylphosphonium hexafluoride, (p-butoxybenzyl) triphenylphosphonium bromide, (p-butoxybenzyl)triphenylphosphonium chloride, (p-methoxybenzyl) triphenylphosphonium chloride, (dimethoxybenzyl) triphenylphosphonium bromide, (p-dimethylaminobenzyl)triphenylphosphonium chloride, (p-butoxybenzyl)triphenylphosphonium tetrafluoroboride, antimony(p-butoxybenzyl) triphenylphosphonium hexafluoride, tetraphenyl(p-butoxybenzyl)triphenylphosphonium boride, (p-butoxybenzyl)

triphenylphosphonium acetate, (p-butoxybenzyl) triphenylphosphonium tetra(perfluorophenyl)borate, (p-butoxybenzyl) triphenylphosphonium iodide, phenacyltriphenylphosphonium bromide, phenacyltriphenylphosphoniumchloride, ethoxycarbonyl methyltriphenylphosphonium, napthalenyl methyltriphenylphosphonium chloride, fluorenyl triphenylphosphonium chloride, anthracenyl methyltriphenylphosphonium chloride, anthracenyl methyltriphenylphosphonium bromide, pyrenyl methyltriphenylphosphonium bromide, and pyrenyl methyltriphenylphosphoniumchloride.

The iodonium salts can be exemplified by diphenyl iodonium chloride, diphenyl iodonium bromide, diphenyl iodonium tetra(perfluorophenyl)borate, diphenyl iodonium tetrafluoroborate; [phenyl-p-(2-hydroxytetradecyloxy)phenyl] iodonium hexafluoroantimonate, [phenyl-p-(2-hydroxytetradecyloxy)phenyl]iodonium chloride, [phenyl-p-(2-hydroxytetradecyloxy)phenyl]iodonium bromide, tetra (perfluorophenyl) [phenyl-p-(2-hydroxytetradecyloxy) phenyl]iodonium borate, bis(p-dodecylphenyl) iodonium hexafluoroantimonate, bis(p-dodecylphenyl) iodonium chloride, bis(p-dodecylphenyl) iodonium bromide, bis(p-dodecylphenyl)iodonium tetrafluoroborate, tetra(perfluorophenyl)bis(p-dodecylphenyl)iodonium borate, (p-n-decyloxyphenyl)phenyl iodonium hexafluoroantimonate, [p-(2-hydroxy-n-tetradecyloxy)phenyl]phenyl iodonium trifluoromethanesulfonate, [p-(2-hydroxy-n-tetradecyloxy) phenyl]phenyl iodonium hexafluorophosphate, [p-(2-hydroxy-n-tetradecyloxy)phenyl]phenyl iodonium tetrakis (pentafluorophenyl)borate, bis(p-t-butylphenyl)iodonium hexafluoroantimonate, bis(p-t-butylphenyl)iodonium hexafluorophosphate, bis(p-t-butylphenyl)iodonium trifluoromethane sulfonate, bis(p-t-butylphenyl)iodonium tetrafluoroborate, bis(dodecylphenyl)iodonium hexafluoroantimonate, bis(dodecylphenyl)iodonium tetrafluoroborate, bis (dodecylphenyl)iodonium hexafluorophosphate, and bis (dodecylphenyl)iodonium trifluoromethane sulfonate.

The sulfonium salts may be exemplified by (p-butoxybenzyl)diphenylsulfonium bromide, (p-butoxybenzyl)diphenylsulfonium chloride, (p-butoxybenzyl) diphenylsulfonium tetrafluoroborate, antimony(p-butoxybenzyl)diphenyl sulfonium hexafluoride, (p-butoxybenzyl)diphenylsulfonium tetraphenylborate, (p-butoxybenzyl) diphenylsulfonium acetate, trimethylsulfonium iodide, diphenylmethylsulfonium tetrafluoroborate, diphenylmethylsulfonium iodide, dibenzylmethylsulfonium bromide, benzyldiphenylsulfonium chloride, benzyldodecylmethylsulfonium bromide, (3-methyl-2-butenyl) tetramethylenesulfonium iodide, antimony(2-butenyl) tetramethylene sulfonium hexafluoride, methyloctylphenacyl sulfonium bromide, benzylmethyloctyl sulfoniumbromide, benzyldodecylmethyl sulfonium iodide, and benzyldodecyl methylsulfonium iodide.

There are no special restrictions with regard to the amount in which the curing agent for epoxy resins can be used, but in general it is recommended that the added amount be in the range of 0.001 to 20 parts by weight per 100 parts by weight of the aforementioned silicon-containing compound.

When the silicon-containing compounds are siloxanes that contain in one molecule at least one alkenyl group or an acryl- or methacryl-containing organic group, the compounds are represented by the following average unit formula:

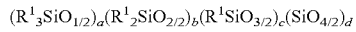

$(R^1{}_3SiO_{1/2})_a(R^1{}_2SiO_{2/2})_b(R^1SiO_{3/2})_c(SiO_{4/2})_d$ wherein $R^1$ may be the same or different and may be selected from substituted or unsubstituted monovalent hydrocarbon groups, hydrogen atoms, halogen atoms, epoxy-containing organic groups, acryl- or methacryl-containing organic groups, amino-containing organic groups, mercapto-containing organic groups, alkoxy groups, and hydroxy groups; however, at least one group designated by $R^1$ in a molecule comprises an alkenyl group or a methacryl-containing organic group; "a", "b", "c", and "d" are numbers that are equal to or greater than 0 and are equal to or lower than 1, and that satisfy the following condition: "a+b+c+d=1"; however, "a", "b" and "c" cannot be equal to 0 altogether at the same time, then the curing agents may be exemplified by radical initiator.

The alkenyl groups or acryl group- or methacryl-containing organic groups used in the silicon-containing compound may be exemplified by the same alkenyl groups and acryl group- or methacryl-containing organic groups that have been designated by $R^1$. The aforementioned silicon-containing compound may have a linear-chained, branch-chained, cyclic, net-like, or partially branched linear molecular structure. The linear-chained molecular structure is preferable. There are no special restrictions with regard to the form of the silicon-containing compound that may be liquid or solid at 25° C.

The radical initiators may comprise an organic peroxide, a photoinitiator, or a photosensitizer. An organic peroxide can be exemplified by dibenzoyl peroxide, bis-p-chlorobenzoyl peroxide, bis-2,4-dichlorobenzoyl peroxide, t-butyl peroxide, dicumyl peroxide, t-butyl perbenzoate, 2,5-bis(t-butylperoxy)-2,3-dimethylhexane, t-butyl peracetate; benzoyl peroxide, bis(o-methylbenzoyl peroxide), bis(m-methylbenzoyl peroxide), bis(p-methylbenzoyl peroxide), 2,3-dimethylbenzoyl peroxide, 2,4-dimethylbenzoyl peroxide, 2,6-dimethylbenzoyl peroxide, 2,3,4-trimethylbenzoyl peroxide, 2,4,6-trimethylbenzoyl peroxide, or similar methyl-substituted benzoyl peroxides; t-butyl perbenzoate, dicumyl peroxide, 2,5-dimethyl-2,5-di(t-butylperoxy) hexane, t-butylperoxy isopropyl monocarbonate, t-butyl peroxyacetate, or mixtures of the aforementioned compounds.

The photoinitiators can be exemplified, e.g., by 2,2-dialkoxy-1,2-diphenylethan-1-one, 2-alkoxy-1,2-diphenylethan-1-one, or similar benzoin ethers.

The photosensitizers may comprise, e.g., benzyl or its derivatives, aromatic diazonium salts, anthraquinone or its derrivatives, acetophenone or its derivatives, diphenyl disulfide, and benzophenone and its derivatives.

There are no special restrictions with regard to amounts in which the aforementioned photosensitizers can be used, but in general it is recommended to use them in an amount of 0.01 to 20 wt. % per weight of the silicon-containing compound, more specifically, in an amount of 0.1 to 20 parts by weight, preferably, 0.1 to 10 parts by weight per 100 parts by weight of the silicon-containing compound.

There are no special restrictions in the process of the present invention with regard to proportions in which the curable silicon-containing compound, or the composition that contains such a compound, and the silicon-free organic polymer have to be mixed. It may be recommended, however, to mix them in a weight ratio of the compound to the polymer in the range of (80:20) to (0.1:99.9). If the content of the curable silicon-containing compound, or the composition that contains such a compound exceeds the recommended upper limit, it will be difficult to control the particle diameter of the silicon-containing particles. If, on the other hand, the aforementioned content is below the recommended lower limit, this will decrease production efficiency in the manufacture of the silicon-containing particles.

The process of the present invention makes it possible to form a uniform phase at least from a curable silicon-containing compound or a composition that contains such a compound, and a silicon-free organic polymer. When the aforementioned organic polymer is liquid at room temperature, the uniform phase can be formed by adding the curable silicon-containing compound, or the composition that contains such a compound, by known methods. However, if the aforementioned organic polymer is solid at room temperature, for mixing with the silicon-containing compound or the composition, this polymer should be used in a molten state.

The mixing equipment may be exemplified, e.g., by a Ross mixer, a planetary mixer, and a Henschel mixer.

If an organic solvent is used in the process of the present invention, the silicon-free organic polymer can be used in a soluble state. In this case, the organic polymer can be liquid or solid at room temperature.

There are no special restrictions with regard to the organic solvent suitable for this purpose, provided that the silicon-free organic polymer and the curable silicon-containing compound or a composition that contains such a compound, can be dissolved in this solvent, and that this solvent does not participate in curing of the curable silicon-containing compound or a composition that contains such a compound.

The organic solvent can be exemplified by benzene, toluene, xylene, or similar aromatic hydrocarbons; hexane, cyclohexane, heptane, octane, or similar aliphatic hydrocarbons; acetate, methylethylketone, methylisobutylketone, or similar ketones; dimethylether, diethylether, tetrahydrofuran, or similar ethers; butyl formate, methyl acetate, ethyl acetate, butyl acetate, ethyl propionate, Cellosolve acetate, or similar esters. Preferable are the aromatic hydrocarbons, especially, toluene and xylene.

There are no special restrictions with regard to the amount in which the organic solvent can be used, provided that it is sufficient for obtaining a sufficient amount of the dissolved curable silicon-containing compound, or the composition that contains such a compound, and of the silicon-free organic polymer. In general, however, it may be recommended to use the solvent in an amount of 1 to 1,000 parts by weight, preferably 10 to 500 parts by weight, and more preferably 50 to 250 parts by weight per 100 parts by weight of the sum of the curable silicon-containing compound, or the composition that contains such a compound, and of the silicon-free organic polymer.

There are no special restrictions with regard to the reaction temperature of curing the curable silicon-containing compound, or the composition that contains such a compound, but it may be recommended to conduct the curing at a temperature from room temperature to 200° C., preferably from 50 to 180° C. When the curable silicon-containing compound or the composition that contains such a compound is cured by irradiation with high-energy rays, room temperature is preferable. In this case, the curable silicon-containing compound or the composition that contains such a compound is formed into silicon-containing particles by the curing reaction and is phase separated from organic polymer.

The silicon-containing particles of the present invention are characterized by being prepared by the method of the invention. Although there are no special restrictions with regard to the diameter of the silicon-containing particles, it is recommended that the average diameter of these particles be in the range of 5 nm to 50 μm, preferably 10 nm to 20 μm, and more preferably in the range of 20 nm to 5 μm. Also, there are no special restrictions with regard to the shape of the particles, although a substantially spherical. Preferable is spherical shape.

The organic polymer composition of the present invention contains at least the aforementioned silicon-containing compound and the silicon-free organic polymer. The organic polymer is the same as one exemplified above. There are no special restrictions with regard to the amount of silicon-containing particles in the organic polymer composition. It may be recommended, however, that the silicon-contained particles be used in an amount of 0.1 to 1,000 parts by weight, preferably 0.1 to 700 parts by weight, and most preferably 0.1 to 200 parts by weight per 100 parts by weight of the silicon-free organic polymer.

The organic polymer composition may be combined with various arbitrary components, such as plasticizers, photostabilizers, antioxidants, fillers, coloring agents, processing improvers, antistatic agents, UV absorbers, pigments, etc.

The fillers may be exemplified by fumed silica, precipitated silica, baked silica, or a similar reinforcement fillers; quartz powder, diatomaceous earth, calcium carbonate, zinc carbonate, zinc oxide, aluminum hydroxide, aluminum oxide, magnesium oxide, iron oxide, titanium oxide, mica, or similar non-reinforcement fillers; the aforementioned fillers subjected to surface hydrophobic treatment with organic silicon compounds such as methyltrichlorosilane, dimethyldichlorosilane, ethyltrichlorosilane, or a similar organochlorosilanes; hexamethyldisilazane, 1,1,3,3,5,5-hexamethylcyclotrisilazane, or a similar organosilazane; methyltrimethoxysilane, dimethyldimethoxysilane, or a similar organoalkoxysilane; or the like. The aforementioned compounds can be used in a combination of two or more.

There are no special restrictions with regard to a method for the preparation of the organic polymer composition, but as it has been mentioned in the description relating to the method of manufacturing of the silicon-containing particles, the organic polymer composition that includes silicon-containing particles dispersed in it can be prepared by curing a curable silicon-containing compound contained in the silicon-free organic polymer or a curable composition that contains the aforementioned compound in the silicon-free organic polymer. The silicon-containing particles are temporarily separated from the thus-obtained organic polymer composition and then mixed with a separately prepared silicon-free organic polymer and, if necessary, with arbitrary components.

There are no special restrictions with regard to a method of mixing the silicon-containing particles with the organic polymer, and mixing can be carried out, e.g., with the use of a Henschel mixer, a ribbon blender, a high-speed mixer, various extruders, or the like.

The process of the present invention for producing the ceramic material is characterized by baking a composition comprising the aforementioned silicon-containing particles or these particles and the silicon-free organic polymer. There are no special restrictions with regard to a process of ceramification used in the process of the present invention. For example, the composition that comprises the aforementioned silicon-containing particles or these particles and the silicon-free organic polymer can be baked in an inert gas or under a reduced pressure at a temperature in the range of 500 to 2,300° C., preferably in the range of 600 to 2,300° C., and most preferably, in the range of 800 to 2,300° C.

For obtaining a SiOC-type or a SiCON-type ceramic, the ceramic composition which is prepared by the method described above from the silicon-containing particles alone or from the particles with silicon-free organic polymer and which may vary depending on baking conditions and the starting materials, can be baked in an inert gas or under a reduced pressure at a temperature ranging from 500 to 1,500° C., preferably 600 to 1,400° C., and most preferably 800 to 1,300° C. If the baking temperature exceeds the recommended upper limit, this will decrease a desired coefficient of ceramic shrinkage, and the ceramic will change into a different modification. If, on the other hand, the baking temperature is below the recommended lower limit, this will result in insufficient ceramification.

Therefore, it is recommended that the heating temperature (the finally achieved temperature) used in the process of ceramification be within the recommended range. If necessary, however, the ceramification process can be performed in two stages, i.e., at a temperature lower than the final temperature in the first stage, and then at the final temperature in the second stage. Alternatively, the process may consist of a single stage, in which the stage of particle formation and the stage of ceramification are combined.

With reference to the composition of the silicon-containing polymer as a standard, the ceramic materials obtained by the method described above contain silicon, carbon, oxygen, nitrogen, and/or hydrogen variable in a wide range of ratios. In general, the ceramic material is represented by the following formula: $SiO_xC_y$, where "x" and "y" are numbers that satisfy the following conditions: $0 \leq x \leq 2$; $0 < y < 100$; preferably numbers that satisfy the following conditions: $0 \leq x \leq 2$; $0 < y < 50$; and the most preferably, the following conditions: $0 \leq x \leq 2$; $0 < y < 20$. Although it cannot be seen from the chemical formula, the hydrogen or nitrogen can also be present in minute quantities (not exceeding 5 wt. %). The ceramic materials of the invention may contain atoms of boron, titanium, phosphorus, tin, Al, Mg, Zn, Zr, etc.

On the other hand, for obtaining a SiN-type ceramic material, a SiC-type ceramic material, or the like, it is recommended to carry out baking in the atmosphere of an inert gas at a temperature equal to or greater than 1,300° C., preferably greater than 1,400° C., and most preferably, greater than 1,500° C. If the baking temperature is lower than 1,300° C., the thermal decomposition process will not progress. On the other hand, although there are no special restrictions with regard to the upper limit of the baking temperature, it is recommended that this temperature be equal to 2,300° C., preferably to 2,000° C. Therefore, it is recommended that the heating temperature (the finally achieved temperature) used in the process of ceramification be within the recommended range. If necessary, however, the ceramification process can be performed in two stages, i.e., at a temperature lower than the final temperature in the first stage, and then at the final temperature in the second stage. Alternatively, the process may consist of a single stage, in which the stage of particle formation and the stage of ceramification are combined.

When the raw material is comprised of spherical cross-linked silicon-containing particles, a spherical ceramic material can be obtained. When a thermosetting resin that includes spherical silicon-containing particles is used, it becomes possible to obtain a carbon-based composite material with spherical ceramics dispersed in it.

When the ceramification process is carried out in an atmosphere of inert gas, the preferable inert gas is nitrogen, helium, or argon. Depending on the type of the ceramic material to be produced, the inert gas may also comprise gaseous hydrogen, methane, carbon monoxide, silane, or ammonia. For example, when silicon-containing particles or a polymer composition that contains such particles is baked in gaseous ammonia, or if the organic polymer or the silicon-containing particles that contain nitrogen in the starting material is baked, a nitrogen-containing ceramic can be obtained.

The process of ceramification can be carried out in a fixed-bed or a fluidized-bed carbonization furnace, and, if such a furnace allows adjustment of the temperature to a required value, there are no other restrictions applied. For example, the baking furnace may be of a muffle type, a Reidhammer furnace, a tunnel-type furnace, a single furnace.

In the production of SiC-based ceramic material, minute amounts of residual free silica or free carbon may remain after the process. The residual free carbon can be eliminated with a decarbonization process, which is heating of the residual free carbon in the atmosphere at a temperature of 600 to 900° C., preferably at a temperature of 700° C. or more. The free silica can be removed by means of a strong acid or a strong-base treatment agent. Such a treatment agent may be exemplified, e.g., by a hydrofluoric acid (HF) as a strong acid and by a potassium hydroxide (KOH) as a strong base, of which the hydrofluoric acid (HF) is preferable.

The ceramic material is treated by being brought into contact with the treatment agent. Normally, the treatment agent is used in the form of an aqueous solution. However, the ceramic may be treated by bringing it into contact with gaseous treatment agents. When the treatment agent is a solution, concentration of the agent should be in the range of 3 to 30 wt. %, preferably 15 to 25 wt. %. The treatment agent should be used in an amount excessive with respect to the free silica that exists in the ceramic material prior to the treatment.

Since in general the ceramic material is obtained as a cluster of particles, it has to be crushed and mixed with the treatment agent. For a predetermined time, the ceramic material is maintained in contact with the treatment agent. Normally, the treatment time ranges from 2 min to 24 hours, preferably 5 min. to 4 hours. There are no special restrictions with regard to the treatment temperature but it is recommended that this temperature be below the boiling point of the treatment agent. The treated ceramic material is filtered, and then washed and dried.

EXAMPLES

The present invention, i.e., the silicon-containing particles, the process for producing the same, the organic polymer composition, the ceramic material, and the process for producing the same will be further explained in details with reference to practical examples. If not specified, in the practical examples all values of viscosities correspond to viscosities at 25° C.

Practical Example 1

A uniform solution was obtained by adding a curable silicone composition consisting of 5 g of a tetramethyltetravinyl cyclotetrasiloxane and 22.4 g of an organopolysiloxane represented by the following average formula:

$(CH_3)_2HSiO[(C_6H_5)_2SiO]_{2.5}Si(CH_3)_2H$ to a solution consisting of 30 g of polystyrene having a polymerization degree of about 2,000 and 20 g of toluene. The components were mixed. Following this, the obtained solution was combined with a platinum complex of 1,3-divinyltetramethyl disiloxane (used in such an amount that in terms of weight units the content of metallic platinum with respect to the weight of the aforementioned curable silicone composition is 20 ppm) added dropwise, and the components were stirred to a sufficient degree at room temperature. Following this, the curable silicone composition was cured to a sufficient degree by heating for 30 min in an oven at 110° C. As a result, a gel-like substance having white turbitidy was obtained. This gel-like substance was heated under a reduced pressure for removal of toluene, whereby a polystyrene composition was obtained. Observation of the obtained composition under a scanning electronic microscope (hereinafter referred to as "SEM") showed that the polystyrene contains uniformly dispersed silicon-containing particles. The composition was extracted with toluene, whereby regular-shaped spherical silicon-containing particles having an average particle diameter of 0.5 µm were obtained.

The obtained silicon-containing particles were loaded into an alumina container and were baked in a muffle furnace for 2 hours at 600° C. and then for 1 hour at 1,000° C. After cooling, black particles were obtained with a 72% yield. SEM observation showed that the particles had a spherical shape and an average particle diameter of about 0.45 µm. Energy Dispersive X-ray analysis (hereinafter referred to as "EDX") showed that the particles consisted mostly of Si, O, and C, while X-ray Photoelectron Spectroscopy (hereinafter referred to as "XPS") showed that the composition had the following structure: $Si_{1.00}O_{0.40}C_{2.20}$. Furthermore, observation under X-ray diffraction conditions (Cu—Kα) in the X-ray Diffraction analysis (hereinafter referred to as "XRD") showed a broad specific absorption peak originated from the amorphous structure of the SiOC-based ceramic material with 2θ near 25 and an absorption peak originated from the graphene structure at 2θ near 44.

The SiOC-based ceramic material was heated in the argon atmosphere to 1,500° C. with a temperature increase rate of about 5° C./min. After holding the heated product for 1 hour, the product was naturally cooled and then baked for 1 hour in air at 700° C. As a result, an ash-color product was obtained. By means of a 20 wt. % HF solution, this product was treated for 10 min at room temperature, then filtered and washed with distilled water until the washing liquid became neutral. Following this, the product was washed again once with ethanol and then dried at 150° C. As a result, a fine blue powder was obtained (with a yield at about 40% weight ratio relative to the original siloxane). The elemental analysis of the powder gave the following results: Si=65 wt. %; oxygen=1.0 wt. %; and carbon=30 wt. %. The solid silicon Nuclear Magnetic Resonance analysis (hereinafter referred to as "NMR") of the obtained powder showed only −21.31 ppm signals originated in SiC units. Furthermore, observation under X-ray diffraction conditions (Cu—Kα) in the XRD showed specific absorption peaks originated from β-SiC with 2θ near 35.76, 60.04, and 71.92. SEM showed that the particles had a spherical shape and an average particle diameter of about 0.30 µm.

The polystyrene composition that contained the aforementioned silicon-containing particles was loaded also into an alumina container and baked in a muffle furnace first for 2 hours at 600° C. and then for 1 hour at 1,000° C. After cooling, a black powder was obtained with a yield of 37%. Observations under SEM showed spherical particles with an average particle diameter of about 0.45 µm. The XPS showed that the particles had the following composition: $Si_{1.00}O_{0.40}C_{2.30}$. Furthermore, observation under X-ray diffraction conditions (Cu—Kα) in the XRD showed a broad specific absorption peak originated from the amorphous structure of the SiOC-based ceramic material with 2θ near 25 and an absorption peak originated from the graphene structure at 2θ near 44.

Practical Example 2

A uniform solution was obtained by adding a curable silicone composition consisting of 2.3 g of a tetramethyltetravinyl cyclotetrasiloxane and 10.5 g of an organopolysiloxane represented by the following average formula:

$(CH_3)_2HSiO[(C_6H_5)_2SiO]_{2.5}Si(CH_3)_2H$ to a solution consisting of 30 g of polystyrene having a polymerization degree of about 2,000 and 20 g of toluene. The components were mixed. Following this, the obtained solution was combined with a platinum complex of 1,3-divinyltetramethyl disiloxane (used in such an amount that in terms of weight units the content of metallic platinum with respect to the weight of the aforementioned curable silicone composition is 20 ppm) added dropwise, and the components were stirred to a sufficient degree at room temperature. Following this, the curable silicone composition was cured to a sufficient degree by heating for 30 min in an oven at 110° C. As a result, a gel-like substance having white turbitidy was obtained. This gel-like substance was heated under a reduced pressure for removal of toluene, whereby a polystyrene composition was obtained. Observation of the obtained composition with SEM showed that the polystyrene contains uniformly dispersed silicon-containing particles. The composition was extracted with toluene, whereby regular-shaped spherical silicon-containing particles having an average diameter of 115 nm were obtained.

The obtained silicon-containing particles were loaded into an alumina container and were baked in a muffle furnace in a nitrogenous atmosphere for 2 hours at 600° C. and then for 1 hour at 1,000° C. After cooling, black particles were obtained with a 72% yield. SEM observation showed that the particles had a spherical shape and an average particle diameter of about 100 nm. The EDX showed that the particles consisted mostly of Si, O, and C, while the XPS showed that the composition had the following structure: $Si_{1.00}O_{0.40}C_{2.23}$. Furthermore, observation under X-ray diffraction conditions (Cu—Kα) of the XRD showed a broad specific absorption peak originated from the amorphous structure of the SiOC-based ceramic material with 2θ near 25 and an absorption peak originated from the graphene structure at 2θ near 44.

Practical Example 3

A uniform solution was obtained by adding a curable silicone composition consisting of 24 g of an organopolysiloxane represented by the following average unit formula:

$\{(CH_2=CH)(CH_3)_2SiO_{1/2}\}_{0.25}(C_6H_5SiO_{3/2})_{0.75}$, 2.4 g of an organopolysiloxane represented by the following formula:

$(CH_3)_2HSiO[(C_6H_5)_2SiO]Si(CH_3)_2H$, and 2.4 g of an organopolysiloxane represented by the following formula:

$C_6H_5Si\{OSi(CH_3)_2H\}_3$ to a solution consisting of 2.4 g of polystyrene having a polymerization degree of about 2,000 and 3.0 g of toluene. The components were mixed. Following this, the obtained solution was mixed with 0.01 g of a platinum complex of 1,3-divinyltetramethyl disiloxane and 0.1 g of a methyl tris (1,1-dimethyl-2-propynoxy)silane, and the components were stirred to a sufficient degree at room temperature. Following this, the curable silicone composition was cured to a sufficient degree by heating for 30 min in an oven at 110° C. As a result, a gel-like substance having white turbitidy was obtained. This gel-like substance was heated under a reduced pressure for removal of toluene, whereby a polystyrene composition was obtained. Observation of the obtained composition under a SEM showed that the polystyrene contains uniformly dispersed silicon-containing particles. The composition was extracted with toluene, whereby regular-shaped spherical silicon-containing particles having an average particle diameter of 2.5 µm were obtained.

The obtained silicon-containing particles were loaded into an alumina container and were baked in a muffle furnace in a nitrogenous atmosphere for 2 hours at 600° C. and then for 1 hour at 1,000° C. After cooling, black particles were obtained with a 71% yield. SEM observation showed that the particles had a spherical shape and an average particle diameter of about 2.2 μm. EDX showed that the particles consisted mostly of Si, O, and C, while the XPS showed that the composition had the following structure: $Si_{1.00}O_{0.79}C_{2.00}$. Furthermore, observation under X-ray diffraction conditions (Cu—Kα) in the XRD showed a broad specific absorption peak originated from the amorphous structure of the SiOC-based ceramic material with 2θ near 25 and an absorption peak originated from the graphene structure at 2θ near 44.

The SiOC-based ceramic material was heated in an argon atmosphere to 1,600° C. with a temperature increase rate of about 5° C./min After holding the heated product for 1 hour, the product was naturally cooled and then baked for 1 hour in air at 700° C. As a result, an ash-colored product was obtained. By means of a 20 wt. % HF solution, this product was treated for 10 min. at room temperature, then filtered and washed with distilled water until the washing liquid became neutral. Following this, the product was washed again once with ethanol and then dried at 150° C. As a result, a fine blue powder was obtained (with the yield at about 42% weight ratio relative to the original siloxane). The elemental analysis of the powder gave the following results: Si=66 wt. %; oxygen=0.9 wt. %; and carbon=31 wt. %. The solid silicon NMR of the obtained powder showed only −21.31 ppm signal originated in SiC units. Furthermore, observation under X-ray diffraction conditions (Cu—Kα) in the XRD showed specific absorption peaks originated from β-SiC with 2θ near 35.76, 60.04, and 71.92. The SEM showed that the particles had a spherical shape and an average particle diameter of about 1.3 μm.

Practical Example 4

A uniform solution was obtained by adding a curable silicone composition consisting of 5 g of a tetramethyltetravinyl cyclotetrasiloxane and 22.4 g of an organopolysiloxane represented by the following average formula:

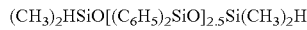

$(CH_3)_2HSiO[(C_6H_5)_2SiO]_{2.5}Si(CH_3)_2H$ to a solution consisting of 30 g of a novolac-type phenolic resin (BRG558, the product of Showa Highpolymer Company, Ltd.) and 20 g of a methylisobutylketone. The components were mixed. Following this, the obtained solution was combined with a platinum complex of 1,3-divinyltetramethyl disiloxane (used in such an amount that in terms of weight units the content of metallic platinum with respect to the weight of the aforementioned curable silicone composition is 10 ppm) added dropwise, and the components were stirred to a sufficient degree at room temperature. Following this, the curable silicone composition was cured to a sufficient degree by heating for 30 min in an oven at 100° C. As a result, a gel-like substance having white turbitidy was obtained. This gel-like substance was heated under a reduced pressure for removal of methylisobutylketone, whereby a novolac-type phenolic resin composition was obtained. Observation of the obtained composition with SEM showed that the novolac-type phenolic resin composition contained uniformly dispersed silicon-containing particles. The composition was extracted with a methylsiobutylketone, whereby regular-shaped spherical silicon-containing particles having an average particle diameter of 1.0 μm were obtained.

The obtained novolac-type phenolic resin composition having silicon-containing particles was loaded into an alumina container and was baked in a muffle furnace for 2 hours in a nitrogenous atmosphere at 600° C. and then for 1 hour at 1,000° C. After cooling, black particles were obtained with a 52% yield. SEM observation showed that the product contained spherical particles of an average particle diameter of about 0.8 μm that were dispersed in the matrix. The EDX showed that the particles consisted mostly of a SiOC component, and the matrix consisted mainly of carbon, while the XPS showed that the composition had mainly the following structure: $Si_{1.00}O_{0.60}C_{2.40}$ and that the matrix consisted mainly of carbon. Furthermore, observation under X-ray diffraction conditions (Cu—Kα) of the XRD showed a broad specific absorption peak originated from the amorphous structure of the SiOC-based ceramic material with 2θ near 25 and an absorption peak originated from the graphene structure at 2θ near 44.

Practical Example 5

A uniform solution was obtained by adding a curable silicone composition consisting of 5 g of a tetramethyltetravinyl cyclotetrasiloxane and 22.4 g of an organopolysiloxane represented by the following average formula:

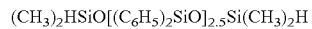

$(CH_3)_2HSiO[(C_6H_5)_2SiO]_{2.5}Si(CH_3)_2H$ to a solution consisting of 30 g of toluene and 10 g of poly (o-cresyl glycidyl ether)-co-formaldehyde resin (the product of Aldrich Chemical Company) having a number-average molecular weight of 1,270. The components were mixed. Following this, the obtained solution was combined with a platinum complex of 1,3-divinyltetramethyl disiloxane (used in such an amount that in terms of weight units the content of metallic platinum with respect to the weight of the aforementioned curable silicone composition is 10 ppm) and 0.1 g of methyl tris(1,1-dimethyl-2-propynoxy)silane added dropwise, and the components were stirred to a sufficient degree at room temperature. Following this, the curable silicone composition was cured to a sufficient degree by heating for 30 min in an oven at 100° C. As a result, a gel-like substance having white turbitidy was obtained. This gel-like substance was heated under a reduced pressure for removal of toluene, whereby a poly(o-cresyl glycidyl ether)-co-formaldehyde resin composition was obtained. Observation of the obtained composition with SEM showed that the poly(o-cresyl glycidyl ether)-co-formaldehyde resin contained uniformly dispersed silicon-containing particles. The composition was extracted with a methylsiobutylketone, whereby regular-shaped spherical silicon-containing particles having an average particle diameter of 1.0 μm were obtained.

Practical Example 6

A uniform solution was obtained by adding a curable silicone composition consisting of 10.0 g of a tetramethyltetravinyl cyclotetrasiloxane and 8.75 g of a methylhydrogen polysiloxane capped at both molecular terminals with trimethylsiloxy groups (viscosity=20 mP·s) to a solution consisting of 30 g of toluene and 10 g of a polyisobutylene having a weight-average molecular weight of 1,000,000. The components were mixed. Following this, the obtained solution was combined with a platinum complex of 1,3-divinyltetramethyl disiloxane (used in such an amount that in terms of weight units the content of metallic platinum with respect to the weight of the aforementioned curable silicone composition is 10 ppm) and 0.1 g of a methyl tris(1,1-dimethyl-2-propynoxy)silane, and the components were stirred to a sufficient degree at room temperature. Following this, the curable silicone composition was cured to a sufficient degree by heating for 30 min in an oven at 100° C. As a result, a gel-like substance having white turbitidy was obtained. This gel-like substance was heated under a reduced pressure for removal of toluene, whereby a polyisobutylene composition was obtained. Observation of the obtained composition with SEM showed that the polyisobutylene contained uniformly dispersed silicon-containing particles. The composition was extracted with toluene, whereby regular-shaped spherical silicon-containing particles having an average particle diameter of 1.5 μm were obtained.

The obtained silicon-contained particles were loaded into an alumina container and was baked in a muffle furnace in a nitrogenous atmosphere for 2 hours at 600° C. and then for 1 hour at 1,000° C. After cooling, black particles were obtained with a 75% yield. SEM observation showed that the product contained spherical particles of an average particle diameter of about 0.8 μm that were dispersed in the matrix. The EDX showed that the particles consisted mostly of a Si, O, and C components. while the XPS showed that the composition had mainly the following structure: $Si_{1.00}O_{0.90}C_{1.70}$. Furthermore, observation under X-ray diffraction conditions (Cu—Kα) of the XRD showed a broad specific absorption peak originated from the amorphous structure of the SiOC-based ceramic material with 2θ near 25 and an absorption peak originated from the graphene structure at 2θ near 44.

Practical Example 7

A uniform solution was obtained by adding a curable silicone composition consisting of 5 g of a tetramethyltetravinyl cyclotetrasiloxane and 22.4 g of an organopolysiloxane represented by the following average formula:

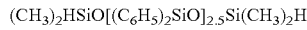

$(CH_3)_2HSiO[(C_6H_5)_2SiO]_{2.5}Si(CH_3)_2H$ to a solution consisting of 30 g of toluene and 20 g of a polymethylacrylate having a weight-average molecular weight of 40,000. The components were mixed. Following this, the obtained solution was combined with a platinum complex of 1,3-divinyltetramethyl disiloxane (used in such an amount that in terms of weight units the content of metallic platinum with respect to the weight of the aforementioned curable silicone composition is 10 ppm) and 0.1 g of methyl tris(1,1-dimethyl-2-propynoxy) silane added dropwise, and the components were stirred to a sufficient degree at room temperature. Following this, the curable silicone composition was cured to a sufficient degree by heating for 30 min in an oven at 100° C. As a result, a gel-like substance having white turbitidy was obtained. This gel-like substance was heated under a reduced pressure for removal of toluene, whereby a polymethylacrylate composition was obtained. Observation of the obtained composition with SEM showed that the polymethylacrylate contained uniformly dispersed silicon-containing particles. The composition was extracted with toluene, whereby regular-shaped spherical silicon-containing particles having an average particle diameter of 13.0 μm were obtained.

Practical Example 8

A uniform solution was obtained by mixing 10.0 g of 1,1,3,3-tetramethyl-1,3-di(2-(3,4-epoxycyclohexyl)ethyl) disiloxane with a solution consisting of 10 g of toluene and 10 g of a polystyrene having a polymerization degree of about 2,000. Following this, the obtained solution was combined with 2.2 g of a triethylenetetramine, and the components were stirred to a sufficient degree at room temperature. Following this, the product was heated in an oven in a nitrogenous atmosphere at 180° C. for 60 min for melting polystyrene and then cooled to room temperature. As a result, a polystyrene composition having white turbitidy was obtained. Observation of the obtained composition with SEM showed that the polystyrene contained uniformly dispersed silicon-containing particles. The composition was extracted with toluene, whereby regular-shaped spherical silicon-containing particles having an average praticle diameter of 1.5 μm were obtained. The obtained silicon-contained particles were loaded into an alumina container and was baked in a muffle furnace in a nitrogenous atmosphere for 2 hours at 600° C. and then for 1 hour at 1,000° C. After cooling, black particles were obtained with a 52% yield. SEM observation showed that the product contained spherical particles of an average particle diameter of about 0.8 μm that were dispersed in the matrix. The EDX showed that the particles consisted mostly of a Si, O, and C components. while the XPS showed that the composition had mainly the following structure: $Si_{1.00}O_{1.00}C_{1.60}$. The matrix consisted mainly of carbon. Furthermore, observation under X-ray diffraction conditions (Cu—Kα) of the XRD showed a broad specific absorption peak originated from the amorphous structure of the SiOC-based ceramic material with 2θ near 25 and an absorption peak originated from the graphene structure at 2θ near 44.

The SiOC-based ceramic material was heated in an argon atmosphere to 1,600° C. with a temperature increase rate of about 5° C./min After holding the heated product for 1 hour, the product was naturally cooled and then baked for 1 hour in air at 700° C. As a result, an ash-colored product was obtained. By means of a 20 wt. % HF solution, this product was treated for 10 min. at room temperature, then filtered and washed with distilled water until the washing liquid became neutral. Following this, the product was washed again once with ethanol and then dried at 150° C. As a result, a fine blue powder was obtained (with the yield at about 38% weight ratio relative to siloxane). The elemental analysis of the powder gave the following results: Si=66 wt. %; oxygen=0.8 wt. %; and carbon=32 wt. %. The solid silicon NMR of the obtained powder showed only 21.31 ppm signal originated in SiC units. Furthermore, observation under X-ray diffraction conditions (Cu—Kα) in the XRD showed specific absorption peaks originated from β-SiC with 2θ near 35.76, 60.04, and 71.92. The SEM showed that the particles had a spherical shape and an average particle diameter of about 0.8 μm.

Practical Example 9

A uniform solution was obtained by mixing 10.0 g of 1,1,3,3-tetramethyl-1,3-di(3-methacryloxypropyl)disiloxane with a solution consisting of 10 g of toluene and 10 g of a polystyrene having a polymerization degree of about 2,000. Following this, the solution was combined with 0.5 g of a cumene hydroperoxide, and the components were stirred to a sufficient degree in a nitrogenous atmosphere at room temperature. The product was then heated in an oven at 180° C. for 60 min. After the curable silicone composition was cured to a sufficient degree, the product was cooled to room temperature. As a result, a polystyrene composition having white turbitidy was obtained. Observation of the obtained composition with SEM showed that the polystyrene contained uniformly dispersed silicon-containing particles. The composition was extracted with toluene, whereby regular-shaped spherical silicon-containing particles having an average particle diameter of 0.8 μm were obtained.

Practical Example 10

A uniform solution was obtained by mixing 10.0 g of tetramethyltetravinyl cyclotetrasiloxane with a solution consisting of 10 g of toluene and 10 g of a polystyrene having a polymerization degree of about 2,000. Following this, the solution was combined with 0.5 g of a dicumyl peroxide, and the components were stirred at room temperature to a sufficient degree at room temperature. The product was then heated in an oven at 180° C. for 60 min. After the curable silicone composition was cured to a sufficient degree, the product was cooled to room temperature. As a result, a polystyrene composition having white turbidity was obtained. Observation of the obtained composition with SEM showed that the polystyrene contained uniformly dispersed silicon-containing particles. The composition was extracted with toluene, whereby regular-shaped spherical silicon-containing particles having an average particle diameter of 3.0 μm were obtained.

Practical Example 11

A uniform solution was obtained by adding 5 g of an organopolysiloxane of the following formula:

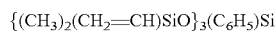

{(CH$_3$)$_2$(CH$_2$=CH)SiO}$_3$(C$_6$H$_5$)Si and 5 g of an organopolysiloxane of the following formula:

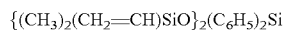

{(CH$_3$)$_2$(CH$_2$=CH)SiO}$_2$(C$_6$H$_5$)$_2$Si to a solution consisting of 10 g of toluene and 10 g of a polystyrene having a polymerization degree of about 2,000. Following this, the solution was combined with 0.5 g of a dicumyl peroxide, and the components were stirred to a sufficient degree at room temperature. The product was then heated in an oven at 180° C. for 60 min. After the curable silicone composition was cured to a sufficient degree, the product was cooled to room temperature. As a result, a polystyrene composition having white turbidity was obtained. Observation of the obtained composition with SEM showed that the polystyrene contained uniformly dispersed silicon-containing particles. The composition was extracted with toluene, whereby regular-shaped spherical silicon-containing particles having an average particle diameter of 10.0 μm were obtained.

Practical Example 12

A uniform solution was obtained by adding a curable silicone composition obtained by mixing 3.0 g of tetramethyltetravinyl cyclotetrasiloxane with 15 g of a methylphenylpolysiloxane capped at both molecular terminals with hydroxyl groups (viscosity=500 mPa·s) to a solution consisting of 30 g of toluene and 30 g of a polystyrene having a polymerization degree of about 2,000. Following this, the solution was combined with 100 mg of a tin octoate, and the components were stirred at room temperature to a sufficient degree at room temperature. The product was heated at 80° C. for 30 min and then at 110° C. for 60 min, whereby the curable silicone composition was cured to a sufficient degree. As a result, a gel-like substance with turbidity was produced. After the toluene was removed by heating the gel-like substance under a reduced pressure, a polystyrene composition was obtained. Observation of the obtained composition with SEM showed that the polystyrene contained uniformly dispersed silicon-containing particles. The composition was extracted with toluene, whereby regular-shaped spherical silicon-containing particles having an average particle diameter of 6.0 μm were obtained.

Practical Example 13

A uniform paraffin composition was obtained by mixing a curable silicone composition consisting of 22.4 g of an organopolysiloxane represented by the following formula:

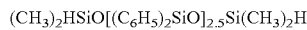

(CH$_3$)$_2$HSiO[(C$_6$H$_5$)$_2$SiO]$_{2.5}$Si(CH$_3$)$_2$H and 5 g of tetramethyltetravinyl cyclotetrasiloxane with 30 g of liquid paraffin having a density of 0.87 g/ml (at 15° C.) and viscosity of about 60 mm$^2$/s (at 40° C.). Following this, the paraffin composition was combined with a platinum complex of 1,3-divinyltetramethyl disiloxane (used in such an amount that in terms of weight units the content of metallic platinum with respect to the weight of the aforementioned curable silicone composition is 10 ppm) added dropwise, and the components were stirred to a sufficient degree at room temperature. Next, the curable silicone composition was cured to a sufficient degree by heating for 30 min in an oven at 120° C. As a result, a paraffin composition having white turbidity was obtained. This composition with toluene, whereby silicon-containing particles having a regular spherical shape and an average particle diameter of 1.5 μm were obtained.

The obtained silicon-containing particles were loaded into an alumina container and were baked in a muffle furnace in a nitrogenous atmosphere for 2 hours at 600° C. and then for 1 hour at 1,000° C. After cooling, black particles were obtained with a 72% yield. SEM observation showed that the particles had a spherical shape and an average particle diameter of about 1.35 μm. The EDX showed that the particles consisted mostly of Si, O, and C, while the XPS showed that the composition had the following structure: Si$_{1.00}$O$_{0.40}$C$_{2.10}$. Furthermore, observation under X-ray diffraction conditions (Cu—Kα) of the XRD showed a broad specific absorption peak originated from the amorphous structure of the SiOC-based ceramic material with 2θ near 25 and an absorption peak originated from the graphene structure at 2θ near 44.

Practical Example 14

A uniform solution was obtained by adding a mixture consisting of 6.3 g of 1,4-bis(dimethylsilyl)benzene and 42.3 g of a toluene solution containing 75 wt. % of an organopolysiloxane of the following average unit formula:

(CH$_2$=CH)(CH$_3$)$_2$SiO$_{1/2}$}$_{0.25}$(C$_6$H$_5$SiO$_{3/2}$)$_{0.75}$ to a solution consisting of 38 g of toluene and 38 g of polystyrene having a polymerization degree of about 2,000. Following this, the obtained solution was combined with a platinum complex of 1,3-divinyltetramethyl disiloxane (used in such an amount that in terms of weight units the content of metallic platinum with respect to the weight of the aforementioned curable silicone composition is 10 ppm) and 0.1 g of 1-ethynyl-1-cyclohexanol added dropwise, and the components were stirred to a sufficient degree at room temperature. Following this, the curable silicone composition was cured to a sufficient degree by heating for 30 min in an oven at 110° C. As a result, a gel-like substance having white turbidity was obtained. This gel-like substance was heated under a reduced pressure for removal of toluene, whereby a polystyrene composition was obtained. Observation of the obtained composition with SEM showed that the polystyrene contained uniformly dispersed silicon-containing particles. The composition was extracted with toluene, whereby regular-shaped spherical silicon-containing particles having an average particle diameter of 4.5 μm were obtained.

The obtained silicon-containing particles were loaded into an alumina container and were baked in a muffle furnace in a nitrogenous atmosphere for 2 hours at 600° C. and then for 1 hour at 1,000° C. After cooling, black particles were obtained with a 72% yield. SEM observation showed that the particles had a spherical shape and an average particle diameter of about 1.35 μm. The XPS showed that the composition had the following structure: Si$_{1.00}$O$_{0.70}$C$_{3.20}$. Furthermore, observation under X-ray diffraction conditions (Cu—Kα) of the XRD showed a broad specific absorption peak originated from the amorphous structure of the SiOC-based ceramic material with 2θ near 25 and an absorption peak originated from the graphene structure at 2θ near 44.

Practical Example 15

A uniform solution was obtained by mixing a curable silicone composition consisting of 15.0 g of 1,4-divinylbenzene, 16.7 g of 1,3,5,7-tetramethyl cyclotetrasiloxane (viscosity=1.0 mPa·s), and 0.02 g of methyl tri(2-methyl-2-butynoxy)silane with a solution consisting of 20 g of toluene and 30 g of polystyrene having a polymerization degree of about 2,000. Following this, the obtained solution was combined with a platinum complex of 1,3-divinyltetramethyl disiloxane (used in such an amount that in terms of weight units the content of metallic platinum with respect to the weight of the aforementioned curable silicone composition is 20 ppm) added dropwise, and the components were stirred to a sufficient degree at room temperature. Following this, the curable silicone composition was cured to a sufficient degree by heating for 30 min in an oven at 150° C. As a result, a gel-like substance having white turbitidy was obtained. This gel-like substance was heated under a reduced pressure for removal of toluene, whereby a polystyrene composition was obtained. Observation of the obtained composition with SEM showed that the polystyrene contained uniformly dispersed silicon-containing particles. The composition was extracted with toluene, whereby regular-shaped spherical silicon-containing particles having an average particle diameter of 5.5 μm were obtained.

The obtained silicon-containing particles were loaded into an alumina container and were baked in a muffle furnace in a nitrogenous atmosphere for 2 hours at 600° C. and then for 1 hour at 1,000° C. After cooling, black particles were obtained with a 32% yield. SEM observation showed that the particles had a spherical shape and an average particle diameter of about 5.0 μm. The XPS showed that the composition had the following structure: $Si_{1.00}O_{0.40}C_{3.20}$. Furthermore, observation under X-ray diffraction conditions (Cu—Kα) of the XRD showed a broad specific absorption peak originated from the amorphous structure of the SiOC-based ceramic material with 2θ near 25 and an absorption peak originated from the graphene structure at 2θ near 44.

Comparative Example 1

A curable silicone composition consisting of 8.75 g of a methylhydrogenpolysiloxane capped at both molecular terminals with trimethylsiloxy groups (viscosity=20 mPa·s) and 10.0 g of a tetramethyltetravinyl cyclotetrasiloxane was added to a solution consisting of 10 g of toluene and 10 g of polystyrene having a polymerization degree of about 2,000. However, the solution separated into two layers. When the solution was stirred, an isopropanol solution of a chloroplatinic acid (used in such an amount that in terms of weight units the content of metallic platinum with respect to the weight of the curable silicone composition was 10 ppm) and 0.1 g of a methyl tris(1,1-dimethyl-2-propionoxy)silane were added dropwise, and the components were stirred to a sufficient degree at room temperature. Following this, the toluene was removed by retaining the solution in an oven for 30 min at 100° C., and at the same time curing of the curable silicone composition to a sufficient degree converted the composition into a two-layer sheet consisting of a cured layer of silicone and a layer of polystyrene. Observation of the obtained sheet with SEM did not reveal the presence of silicon-containing particles.

INDUSTRIAL APPLICABILITY

When silicon-containing particles are produced by the process of the present invention, they contain a reduced amount of impurities, e.g., such as surface-active substances. Since these spherical silicon-containing particles do not lose their original properties such as resistance to heat, electrical characteristics, etc., in addition to their use in cosmetic raw materials and additives to organic resins, they may find application also as additives to viscous electric fluids, etc. The organic polymer compositions that contain such spherical silicon-containing particles may be used for manufacturing flame-retarding adhesive agent, flame resistant films, etc.

The ceramic material of the present invention can be produced by a simple process, with particles of an extremely small diameter, and with controllable properties. Such a ceramic material can be used as an additive to organic resins and to cosmetic materials.

The invention claimed is:

1. A process for producing silicon-containing particles comprising:
   (i) preparing a uniform phase containing a curable silicon-containing compound or a curable composition containing the silicon-containing compound, an organic polymer that (a) is free of silicon and (b) does not participate in a curing reaction of the silicon-containing compound, and an organic solvent wherein the silicon-containing compound or composition is provided as a uniform solution with the organic polymer and solvent;
   (ii) forming silicon-containing particles by carrying out an addition reaction, condensation reaction, ring-opening reaction, or a radical reaction of the curable silicon-containing compound or composition containing the silicon-containing compound wherein the formed silicon-containing particles phase-separate from the organic polymer.

2. The process of claim 1, wherein the curable silicon-containing compound is selected from a siloxane, silane, silazane, carbosilane, and a mixture thereof.

3. The process of claim 1, wherein the curable silicon-containing compound is a siloxane represented by the following average unit formula:

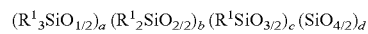

$(R^1{}_3SiO_{1/2})_a (R^1{}_2SiO_{2/2})_b (R^1SiO_{3/2})_c (SiO_{4/2})_d$ wherein $R^1$ are the same or different and selected from substituted or unsubstituted monovalent hydrocarbon groups, hydrogen atoms, halogen atoms, epoxy-containing organic groups, acryl- or methacryl-containing organic groups, amino-containing organic groups, mercapto-containing organic groups, alkoxy groups, and hydroxy groups; "a", "b", "c", and "d" are numbers that are equal to or greater than 0 and are equal to or lower than 1, and that satisfy the following condition: "a +b +c+d =1"; however, "a", "b" and "c" cannot be equal to 0 altogether at the same time.

4. The process of claim 1, wherein the curable silicon-containing compound contains in one molecule, per 10 silicon atoms, one or more groups that possess addition-reaction properties, condensation-reaction properties, ring-opening properties, or radical-reaction properties.

5. The process of claim 1, wherein the curable composition comprises a silicon-containing compound having aliphatic carbon-carbon unsaturated bonds, a compound having silicon-bonded hydrogen atoms, and a hydrosilylation-reaction catalyst.

6. The process of claim 1, wherein the curable composition comprises a silicon-free organic compound having aliphatic carbon-carbon unsaturated bonds, a compound having silicon-bonded hydrogen atoms, and a hydrosilylation-reaction catalyst.

7. The process of claim 1, wherein the curable composition comprises a silicon-containing compound having silanol groups, a compound having silicon-bonded hydrogen atoms, and a condensation-reaction catalyst.

8. The process of claim 1, wherein the curable composition comprises a silicon-containing compound having aliphatic carbon-carbon unsaturated bonds and a radical initiator.

9. The process of claim 1, wherein the curable composition comprises a silicon-containing compound having epoxy-containing organic groups and a curing agent for an epoxy resin.

10. The process of claim 1, wherein the silicon-free organic polymer is selected from a polyethylene, polypropylene, polystyrene, polymethyl methacrylate, AS resin, ABS resin, polyvinyl chloride, polyacetal, polycarbonate, polyester, paraffin, phenolic resin, epoxy resin, urea resin, melamine resin, fluoro resin, imide resin, urethane resin, furan resin, and a mixture thereof.

11. The process of claim 1, wherein the curable silicon-containing compound or the curable composition that contains the compound and the silicon-free organic polymer are used in a weight ratio ranging from (80:20) to (0.1:99.9).

12. A process for producing a ceramic material comprising:
(i) preparing a uniform phase containing a curable silicon-containing compound or a curable composition containing the silicon-containing compound, an organic polymer that (a) is free of silicon and (b) does not participate in a curing reaction of the silicon-containing compound, and an organic solvent wherein the silicon-containing compound or composition is provided as a uniform solution with the organic polymer and solvent;
(ii) forming silicon-containing particles by carrying out an addition reaction, condensation reaction, ring-opening reaction, or a radical reaction of the curable silicon-containing compound or composition containing the silicon-containing compound wherein the formed silicon-containing particles phase-separate from the organic polymer;
(iii) baking the formed silicon-containing particles or a composition comprising the silicon-containing particles and the organic polymer.

13. The process of claim 12, wherein the curable silicon-containing compound is selected from a siloxane, silane, silazane, carbosilane, and a mixture thereof.

14. The process of claim 12, wherein the curable silicon-containing compound is a siloxane represented by the following average unit formula:

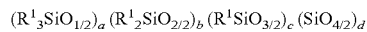

wherein $R^1$ are the same or different and selected from substituted or unsubstituted monovalent hydrocarbon groups, hydrogen atoms, halogen atoms, epoxy-containing organic groups, acryl- or methacryl-containing organic groups, amino-containing organic groups, mercapto-containing organic groups, alkoxy groups, and hydroxy groups; "a", "b", "c", and "d" are numbers that are equal to or greater than 0 and are equal to or lower than 1, and that satisfy the following condition: "a +b +c+d =1"; however, "a", "b" and "c" cannot be equal to 0 altogether at the same time.

15. The process of claim 12, wherein the curable silicon-containing compound contains in one molecule, per 10 silicon atoms, one or more groups that possess addition-reaction properties, condensation-reaction properties, ring-opening properties, or radical-reaction properties.

16. The process of claim 12, wherein the curable composition comprises a silicon-containing compound having aliphatic carbon-carbon unsaturated bonds, a compound having silicon-bonded hydrogen atoms, and a hydrosilylation-reaction catalyst.

17. The process of claim 12, wherein the curable composition comprises a silicon-free organic compound having aliphatic carbon-carbon unsaturated bonds, a compound having silicon-bonded hydrogen atoms, and a hydrosilylation-reaction catalyst.

18. The process of claim 12, wherein the curable composition comprises a silicon-containing compound having silanol groups, a compound having silicon-bonded hydrogen atoms, and a condensation-reaction catalyst.

19. The process of claim 12, wherein the curable composition comprises a silicon-containing compound having aliphatic carbon-carbon unsaturated bonds and a radical initiator.

20. The process of claim 12, wherein the curable composition comprises a silicon-containing compound having epoxy-containing organic groups and a curing agent for an epoxy resin.

21. The process of claim 12, wherein the silicon-free organic polymer is selected from a polyethylene, polypropylene, polystyrene, polymethyl methacrylate, AS resin, ABS resin, polyvinyl chloride, polyacetal, polycarbonate, polyester, paraffin, phenolic resin, epoxy resin, urea resin, melamine resin, fluoro resin, imide resin, urethane resin, furan resin, and a mixture thereof.

22. The process of claim 12, wherein the curable silicon-containing compound or the curable composition that contains the compound and a silicon-free organic polymer are used in a weight ratio ranging from (80:20) to (0.1:99.9).

23. The process of claim 12, wherein the silicon-containing particles have an average diameter of 5 nm to 50 μm.

* * * * *